US 6,687,860 B1

(12) United States Patent
Iijima et al.

(10) Patent No.: US 6,687,860 B1
(45) Date of Patent: Feb. 3, 2004

(54) DATA TRANSFER DEVICE AND DATA TRANSFER METHOD

(75) Inventors: Yukio Iijima, Ikoma (JP); Nobuaki Minakuchi, Ibaraki (JP); Makoto Usui, Osaka (JP); Yasushi Ueda, Saijo (JP); Makoto Okazaki, Niihama (JP); Takahiro Nagai, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/226,604

(22) Filed: Jan. 7, 1999

(30) Foreign Application Priority Data

Jan. 7, 1998 (JP) .......................... 10-001345
Oct. 7, 1998 (JP) .......................... 10-284994

(51) Int. Cl.$^7$ ............................................. G11C 29/00
(52) U.S. Cl. .................... 714/718; 365/201; 714/769
(58) Field of Search .............................. 714/761, 768, 714/702, 701, 718, 763, 769; 365/201

(56) References Cited

U.S. PATENT DOCUMENTS

| | | | |
|---|---|---|---|
| 4,672,614 A | 6/1987 | Yoshida | 371/38 |
| 4,710,934 A | 12/1987 | Traynor | 371/38 |
| 4,748,627 A | 5/1988 | Ohsawa | 371/38 |
| 5,109,360 A | 4/1992 | Inazumi et al. | 365/200 |
| 5,127,014 A | 6/1992 | Raynham | 371/37.3 |
| 5,313,425 A | 5/1994 | Lee et al. | 365/201 |
| 5,864,567 A | 1/1999 | Sato et al. | |
| 5,936,926 A | 8/1999 | Yokouchi et al. | |

FOREIGN PATENT DOCUMENTS

| | | |
|---|---|---|
| JP | 04-213775 | 8/1992 |
| JP | 06-075799 | 3/1994 |
| JP | 08-273347 | 10/1996 |
| JP | 09-065283 | 3/1997 |
| JP | 08-6842 | 1/1998 |

OTHER PUBLICATIONS

"Motion Compensation and Predictive Coding"; The Society of Video Information Media, vol. 51, No. 12 (1997) 3–2, pp. 1976–1979.
"Motion Compensated Predictive Coding"; The Television Society, vol. 49, No. 4 (1995), pp. 444–449.

*Primary Examiner*—Phung M. Chung
(74) *Attorney, Agent, or Firm*—Parkhurst & Wendel, L.L.P.

(57) ABSTRACT

A data transfer device for successively storing data in a data storage unit or successively reading data from the data storage unit in data processing using an array of m rows×n columns, comprises a data storage unit for retaining data which have been stored in storage positions specified by row addresses indicating the positions in the row direction and column addresses indicating the positions in the column direction; a transfer address generation unit for generating transfer addresses comprising the row addresses and the column addresses so that the storage positions for transferred data are successively specified in each of storage blocks having a predetermined size and arranged in the row direction of the data storage unit; and a transfer control unit for controlling data transfer to the data storage unit by using the transfer addresses generated by the transfer address generation unit.

18 Claims, 14 Drawing Sheets

DATA TRANSFER DEVICE AND DATA TRANSFER METHOD

FIELD OF THE INVENTION

The present invention relates to a data transfer device and a data transfer method which are employed when data to be subjected to data processing using an array of a matrix format (rows and columns) are stored in or read from a RAM and, more particularly, to those suitable for the use of a paging RAM in data processing using an array having error correction codes in both the rows and the columns.

BACKGROUND OF THE INVENTION

When recording or transmitting data, for efficient recording or transmission, data are subjected to compression or coding according to a predetermined method, and the compressed or coded data are subjected to decompression or decoding which is the inverse of compression or coding, to be utilized. Further, in order to check and correct errors in data caused by noise or signal attenuation in reading, writing, or transmission of the data, predetermined codes for error checking and correction (hereinafter referred to as "error correcting codes") are assigned according to a method such as parity bit, checksum, or cyclic redundancy check (CRC) when recording or transmitting the data, and error checking and correction (hereinafter referred to as "ECC") using the error correcting codes is performed when decoding the data, whereby reliability is improved.

For example, there is a method in which data are arranged according to a format for error checking and correction having predetermined rows and columns, and row-direction parity data or column-direction parity data (error detecting codes) are assigned to every row or column.

In arithmetic operation to data such as ECC, a DRAM (Dynamic Random Access Memory), which has widely used in computer systems, is employed as a temporary storage means for working storage. A DRAM has addresses in both the row direction and the column direction, and data storage positions in the DRAM are specified by addressing. So, it is possible to realize a storage state suited to a format for error checking and correction, by successively storing data in the DRAM while specifying the storage positions.

Further, a paging DRAM in which data are processed in "page mode", i.e., for each block having a fixed size and called "a page", is employed for reducing the cycle time in memory access, i.e., the time interval between a memory access and next memory access, to achieve high-speed input/output of data to/from the memory. In this case, it is important for efficiency to frequently use the page mode when inputting/outputting data to/from the DRAM.

In a prior art decoder performing decoding with error correction, input data, which have been coded and are to be subjected to error correction, are temporarily stored in a buffer. As this buffer, an FIFO buffer according to FIFO (first-in first-out) is used. Then, the data stored in the FIFO buffer are fetched to be stored in a DRAM in a form suitable for an error correction array which is a format for error correction. Thereafter, the data stored in the DRAM are fetched to be subjected to ECC.

For example, in the case of using an error correction format having parity data in the column direction, when the data to be subjected to ECC are stored in the paging DRAM, the data are stored in the column direction according to the column-direction addresses of the DRAM. This storage enables data reading using the page mode in the column direction when the data stored in the DRAM are read for ECC, whereby high-speed memory access is achieved.

Also in a prior art encoder performing coding with error correction, similar processing is carried out. In the encoder, input data to be subjected to coding and error correction are temporarily stored in a buffer, and the data stored in the buffer are fetched to be stored in a DRAM in a form suitable for an error correction array which is a format for error correction. Then, the data so stored are subjected to coding with error correction, thereby generating coded data to which parity data for error correction are added.

For example, in the case of using an error correction format having parity data in the column direction, when the data to be subjected to ECC are stored in the paging DRAM, the data are stored in the column direction in accordance with the column-direction addresses of the DRAM. This storage enables data reading using the page mode in the column direction when the data stored in the DRAM are read for ECC coding, whereby high-speed memory access is achieved.

Further, in the prior art decoder, interpolation is carried out in the FIFO buffer to deal with the case where defects occur in the input data. For example, when using data sync bytes which are inserted in the input data at intervals of a predetermined amount of data, the data sync bytes are detected to check the amount of data between the data sync bytes included in the data stored in the FIFO buffer, and when the amount of data is less than a predetermined amount, dummy data is added to make the data between the data sync bytes have the predetermined amount.

In recent years, in order to improve the ECC precision, an error correction array of product codes, which is a format for assigning error correction codes to both rows and columns, has been used more frequently. When using this format, it is necessary to perform syndrome operation (polynomial operation) for both the row direction and the column direction in ECC, and the burden on the operation is considerable.

Furthermore, when performing error correction in a decoding process in a system having a control processor such as a computer system, this operation is repeated three times in the routine of "row-direction→column-direction→row-direction" or "column-direction→row direction→column direction", to improve reliability of error correction. In this case, due to the increase in the frequency of access to the DRAM storing the data to be processed, high-speed access in the row direction (or the column direction) is required when the operation is carried out in the order of row-direction→column-direction→row-direction (or column-direction→row direction→column direction).

Moreover, when performing data processing in a computer system or the like, it is desirable to minimize the period during which a processor like a host CPU occupies a bus. Therefore, in a drive unit performing recording/reproduction of data in/from a data recording medium such as an optical disk, it is increasingly needed to increase the recording/reproduction speed, or the data transfer speed between the drive unit and a control unit such as a host computer. In such system, it is also desired to increase the error correction speed.

Consequently, in the data processing in this system, high-speed data input/output are strongly desired and, when using a paging DRAM, it is required that the page mode is used more frequently in both the row direction and the column direction to reduce the frequency of access to the DRAM.

In the prior art encoder or decoder, however, since the data stored in the FIFO buffer are fetched to be stored in the DRAM in the order as entered to the buffer, if the data are stored by using the page mode more frequently for one of the row direction and the column direction, the page mode cannot be frequently used for the other direction.

For example, in the case where the data have been sequentially input in the column direction of the correction array and then sequentially stored in the column direction of the DRAM, when the data are read in the column direction of the array to be subjected to error correction, the data can be successively read using the page mode. However, when the data are read in the row direction of the array, since the possibility that successive data are present in the same row is not very high, the page mode cannot be used frequently.

In the above-described ECC included in the decoding process, when the stored data are fetched in the order of row-direction→column-direction→row-direction and subjected to ECC, delays in the row-direction reading which has more access cycles than the column-direction reading are considerable, resulting in a reduction in efficiency in the whole reading process. Consequently, efficiency in the whole ECC is reduced. This means that the paging DRAM is not efficiently utilized, resulting in that the device resources are not efficiently utilized.

Furthermore, in the case of coding, data are usually processed from row-direction to column-direction or from column direction to row direction. Also in this case, processing efficiency is not satisfactorily high in one of these directions, as described above. Especially when the drive unit is able to perform high-speed recording, this ability of high-speed recording is not sufficiently utilized when rapid error correction is not performed.

Moreover, in the prior art decoder, as described above, the amount of input data is checked when the data are stored in the FIFO buffer and, if the amount is not sufficient, dummy data for interpolation is generated and inserted into the data in the FIFO buffer. So, if the FIFO buffer does not have a sufficient capacity, there is a possibility that the storage is not carried out smoothly due to delays caused by the interpolation, resulting in data defects. On the other hand, to use a large-capacity FIFO buffer to avoid such risk results in increased circuit scale and increased cost.

Further, when recording or transmitting digital data, interleaving (rearrangement of data according to a specific rule) is carried out to facilitate the countermeasure against the case where continuous data defects occur due to, for example, a flaw in the recording medium. For the data which has been subjected to interleaving in the encoder, deinterleaving which is the inverse of interleaving is required in the decoder.

In the prior art decoder, when data storage is performed with priority to the column direction, the interleaving cannot be released in the row direction while it can be released in the column direction, whereby the data which have not been deinterleaved in the row direction are stored in the DRAM. Accordingly, when the data so stored in the DRAM are subjected to ECC in the subsequent stage, deinterleaving in the row direction is also required, and thus the burden on the ECC becomes considerable.

Moreover, in the prior art encoder, since interleaved coded data cannot be obtained, it is necessary to perform interleaving in the subsequent process such as sync signal addition or modulation and, therefore, the burden on the subsequent process is increased.

SUMMARY OF THE INVENTION

The present invention is made to solve the above-described problems and has for its object to provide a data transfer device which stores data to be subjected to ECC into a paging DRAM when performing ECC according to an error correction array of product codes in a coding or decoding process and, more specifically, a data transfer device which can frequently use the page mode for both the process in the row direction and the process in the column direction, and thereby utilize the device resources efficiently to improve efficiency in the process.

It is another object of the present invention to provide a data transfer device which realizes, when storing data in a RAM, the data storage state equivalent to the state where interpolation for data defects has been performed, to make interpolation in the previous-stage FIFO buffer unnecessary, i.e., a data transfer device which can deal with data defects without increasing the capacity of the FIFO buffer.

It is still another object of the present invention to provide a data transfer device which stores data to be subjected to ECC in a RAM, with a format which has been subjected to interleaving or deinterleaving, to reduce the burden on the subsequent process.

It is yet another object of the present invention to provide a data transfer method for storing data to be subjected to ECC into a paging DRAM when performing ECC according to an error correction array of product codes in a coding or decoding process and, more specifically, a data transfer method which can frequently use the page mode for both the process in the row direction and the process in the column direction to improve efficiency in the process.

It is a further object of the present invention to provide a data transfer method which realizes, when storing data in a RAM, the data storage state equivalent to the state where interpolation for data defects has been performed, to make interpolation in the previous-stage FIFO buffer unnecessary, i.e., a data transfer method which can deal with data defects without increasing the capacity of the FIFO buffer.

It is a still further object of the present invention to provide a data transfer method for storing data to be subjected to ECC into a RAM, with a format which has been subjected to interleaving or deinterleaving, to reduce the burden on the subsequent process.

According to a first aspect of the present invention, there is provided a data transfer device for successively storing data in data storage means or successively reading data from the data storage means in data processing using an array of m rows×n columns, and the device comprises: data storage means for retaining data which have been stored in storage positions specified by row addresses indicating the positions in the row direction and column addresses indicating the positions in the column direction; transfer address generation means for generating transfer addresses comprising the row addresses and the column addresses so that the storage positions for transferred data are successively specified in each of storage blocks having a predetermined size and arranged in the row direction of the data storage means; and transfer control means for controlling data transfer to the data storage means by using the transfer addresses generated by the transfer address generation means.

According to a second aspect of the present invention, in the above-described data transfer device, the transfer address generation means comprises: base-n count means for counting the successively-transferred data according to the base-n notation; base-i count means for counting carries generated in the counting process of the base-n count means, according to the base-i notation, with the number of the storage blocks in the column direction being i; column address offset value generation means for generating column address offset values indicating origins in the column direction of the respective storage blocks, according to the result from the base-i count means; base-k count means for counting the input data according to the base-k notation, with the size of each storage block in the column direction being k, thereby generating reference column address values indicating storage positions in the column direction within the respective storage blocks; base-n/k count means for counting carries generated in the counting process of the base-k count means according to the base-n/k notation, thereby generating reference row address values indicating storage positions in the row direction within the respective storage blocks; base-m/i count means for counting carries generated in the counting process of the base-i count means according to the base-m/i notation; row address offset value generation means for generating row address offset values indicating origins in the row direction of the respective storage blocks, according to the result of the count by the base-m/i count means; column address generation means for generating the column addresses by using the column address offset values and the reference column address values; and row address generation means for generating the row addresses by using the row address offset values and the reference row address values.

According to a third aspect of the present invention, in the above-described data transfer device, the successively-transferred data include data synchronous signals which can be specified by a format, at intervals of a predetermined amount of the data; and the device further including count instruction means for obtaining the storage positions for data which follow the data synchronous signal by arithmetic operation, according to the data synchronous signal, and controlling the transfer address generation means to generate transfer addresses indicating the storage positions so obtained.

According to a fourth aspect of the present invention, the above-described data transfer device further includes: base-n count means for counting the successively-transferred data according to the base-n notation; base-m count means for counting carries generated in the base-n count means according to the base-m notation; and count instruction means for obtaining storage positions of specific data by arithmetic operation and controlling the transfer address generation means to generate transfer addresses indicating the obtained storage positions, when transferring the result of predetermined rearrangement performed to the specific data among the transferred data according to the result from the base-m count means.

According to a fifth aspect of the present invention, in the above-described data transfer device, the data processing using an array of m rows×n columns comprises data processing using an array of m1 rows×n1 columns and data processing using an array of m2 rows×n2 columns, on condition that m1>m2 and n1>n2.

According to a sixth aspect of the present invention, the above-described data transfer device further includes: error correction data conversion means performing predetermined data conversion with error correction to the data stored in the data storage means; and conversion address generation means for specifying storage positions for data to be read from the data storage means for the data conversion.

According to a seventh aspect of the present invention, the above-described data transfer device further includes: data format conversion means performing signal conversion between a data format processed by the data transfer device and a data format in a recording medium for data storage; and data transfer means for data storage, performing data transfer between the data transfer device and the recording medium.

According to an eighth aspect of the present invention, thee is provided as data transfer method for successively storing data in data storage means for successively reading data from the data storage means in data processing using an array of m rows×n columns, while specifying the storage positions by row addresses indicating the positions in the row direction and column addresses indicating the positions in the column direction, and this method comprises: transfer address generation step of generating transfer addresses comprising the row addresses and the column addresses so that the storage positions for the transferred data are successively specified in each of storage blocks having a predetermined size and arranged in the row direction of the data storage means; and transfer control step of controlling data transfer to the data storage means by using the transfer addresses generated in the transfer address generation step.

According to a ninth aspect of the present invention, in the above-described data transfer method, the transferred data have data synchronous signals which can be specified by a format, at intervals of a predetermined amount of the data; and the method further includes count instruction step of obtaining the storage positions for data which follow the data synchronous signal, by arithmetic operation, according to the data synchronous signal, and controlling the transfer address generation means to generate transfer addresses indicating the storage positions so obtained.

According to a tenth aspect of the present invention, the above-described data transfer method further includes: base-n count step of counting the successively-transferred data according to the base-n rotation; base-m count step of counting carries generated in the base-n count step according to the base-m notation; and count instruction step of obtaining storage positions for specific data by arithmetic operation and controlling the process in the transfer address generation step to generate transfer addresses indicating the obtained storage positions, when transferring the result of predetermined rearrangement performed to the specific data among the transferred data according to the result from the base-m count step.

According to an eleventh aspect of the present invention, in the above-described data transfer method, the data processing using an array of m rows×n columns comprises data processing using an array of m1 rows×n1 columns and data processing using an array of m2 rows×n2 columns, on condition that m1>m2 and n1>n2.

According to the twelfth aspect of the present invention, in the above-described data transfer method, the array of m1 rows×n1 columns comprises a main data part corresponding to the array of m2 rows×n2 columns, and an error correction parity part which is generated by a predetermined method based on the main data part.

According to a thirteenth aspect of the present invention, the above-described data transfer method further includes error correction data conversion step of performing predetermined data conversion with error correction to the data stored in the data storage means; and conversion address generation step of specifying storage positions for data to be read from the data storage means for the data conversion.

According to a fourteenth aspect of the present invention, in the above-described data transfer method, the error correction data conversion step is error correction data coding step of performing a predetermined data coding process including error correction; and the conversion address generation step is coding address generation step of specifying storage positions for data to be read for the data coding process.

According to a fifteenth aspect of the present invention, in the above-described data transfer method, the error correction data conversion step is error correction data decoding step of performing a predetermined data decoding process including error correction; and the conversion address generation step is decoding address generation step of specifying storage positions for data to be read for the data decoding process.

According to a sixteenth aspect of the present invention, the above-described data transfer method further includes: data format conversion step of performing signal conversion between a data format used in the data transfer method and a data format in a recording medium for data storage; and data transfer step for data storage, performing data transfer to the recording medium.

According to a seventeenth aspect of the present invention, in the above-described data transfer method, the data format conversion step is data modulation step of performing modulation to coded data generated in the data coding process; and the data transfer step is data recording step of recording the data in the recording medium.

According to an eighteenth aspect of the present invention, in the above-described data transfer method, the data format conversion step is data demodulation step of performing demodulation to generate coded data to be processed in a data decoding process; and the data transfer step is data reproduction step of reading demodulated data from the recording medium.

DETAILED DESCRIPTION OF THE PREFERRED EMBODIMENTS

Embodiment 1

A data transfer device according to a first embodiment of the present invention is a data storage unit in which an array for error correction in a decoding process is realized in the storage state of a DRAM, and this data storage unit generates addresses of input data by using a plurality of counters and performs data storage by using the page mode frequently.

Figure 1:
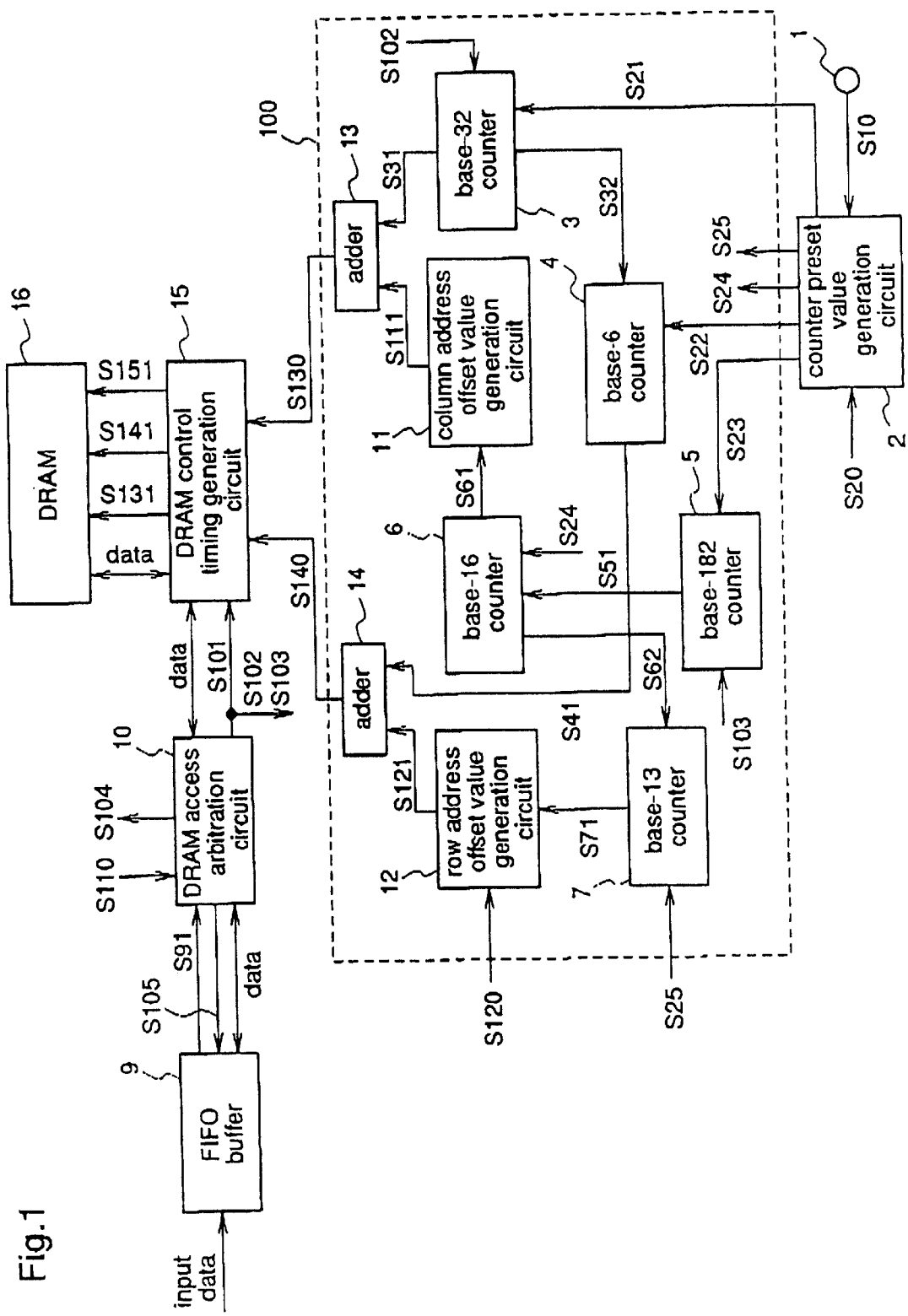
FIG. 1 is a block diagram illustrating a data storage unit according to first and second embodiments of the present invention.

FIG. 1 is a block diagram illustrating a data storage unit according to the first embodiment of the invention. As shown in the figure, the data storage unit comprises a counter preset value generation circuit 2, a storage address generation means 100, an FIFO buffer 9, a DRAM access arbitration circuit 10, a DRAM control timing generation circuit 15, and a DRAM 16. The storage address generation means 100 comprises a base-32 counter 3, a base-6 counter 4, a base-182 counter 5, a base-16 counter 6, a base-13 counter 7, a column address offset value generation circuit 11, a row address offset value generation circuit 12, a column address adder 13, and a row address adder 14. The data storage unit of this first embodiment shears the DRAM 16 with a unit performing error correction or decoding, and these units are controlled by a common CPU (Central Processing Unit). The data storage unit has an ECC transfer start signal input terminal 1 to which a command from the CPU is input.

In FIG. 1, an ECC transfer start signal S10 which indicates an ECC transfer start command is input to the data storage unit through the ECC transfer start signal input terminal 1. The counter preset value generation circuit 2 generates count values to be held by the respective counters included in the storage address generating means 100 and outputs these count values to the counters.

The storage address generation means 100 generates storage addresses comprising row addresses and column addresses so that the sequentially input data are sequentially stored in storage blocks having a predetermined size and arranged in the column direction of the DRAM 16. The base-32 counter 3, the base-6 counter 4, the base-182 counter 5, the base-16 counter 6, and the base-13 counter 7 hold and update the count values used for the generation of storage addresses. The column address offset value generation circuit 11 and the row address offset value generation circuit 12 generate offset values based on the count values obtained. The column address adder 13 and the row address adder 14 function as a column address generation means and a row address generation means, respectively. Namely, these adders generate column addresses and row addresses, respectively, by addition. The functions of the respective counters, circuits and adders will be later described in more detail.

The FIFO buffer 9 is a buffer which temporarily stores data according to FIFO (first-in first-out). The FIFO buffer 9 holds the data under the control of the DRAM access arbitration circuit 10 until the data is transferred to the DRAM 16. The DRAM access arbitration circuit 10 controls input/output of data to/from the DRAM 16. The DRAM control timing generation circuit 15 functions as a storage control means which generates a timing to access the DRAM 16, and controls input/output of data to/from the DRAM by using the storage addresses generated by the storage address generation means 100 and by specifying the address type according to a RAS (Row Access Strobe) signal and a CAS (Column Access Strobe) signal.

The DRAM 16 functions as a data storage means which stores data to be used for arithmetic operation or the like, in corresponding storage positions specified by the addresses. As already described for the prior art, a DRAM is an ordinary semiconductor storage element, and specifies a storage position by using a column address indicating the position in the column direction and a row address indicating the position in the row direction. Since the column address and the row address are input to the same address input pin, a RAS pin and a CAS pin are used to distinguish between them. A RAS signal which is an enable signal for the row-direction address is transmitted by the RAS pin while a CAS signal which is an enable signal for the column-direction address is transmitted by the CAS pin. The DRAM 16 has a capacity of 1M bits, a column address length of 9 bits (512 bytes), and a row address length of 8 bits (256 rows).

Hereinafter, the relationship between the structure of data to be recorded or transmitted and the error correction array will be described and, subsequently, the functions of the counters, circuits, and adders included in the storage address generation means 100 will be described, with reference to FIGS. 2(a)–2(c) and FIG. 3. FIGS. 2(a)–2(c) are diagrams for explaining the error correction array used for ECC. FIG. 3 is a memory map for explaining the storage of data in the DRAM 16.

FIG. 2(a) shows a recording format of data to be subjected to decoding, for one sector of data (a unit of data recording). In the ECC according to this first embodiment, an error correction array having 182 bytes in the column ×208 rows in the row direction is employed, and one array (182 bytes×208 rows) comprises 16 sectors of data.

As shown in FIG. 2(a), one sector comprises 182 bytes× 13 rows, and data sync bytes are inserted at intervals of 91 bytes in the row direction. In this format, one row is composed of the first data sync byte, 91 bytes of data D0~D90, the second data sync byte, and 91 bytes of data D91~D181. The data D0~D181 have been modulated. The data sync bytes are inserted to improve precision in data reading. Since the data sync bytes have a pattern which is not used for the modulated data, the bytes are distinguishable from the modulated data.

The data synchronous bytes are deleted from the data having the above-described format, and demodulation adapted to the above-described modulation is carried out, resulting in one sector of demodulated data as shown in FIG. 2(b). Hereinafter, the parity data for error correction in the row direction and the column direction are referred to as row-direction parities and column-direction parities, respectively. In the demodulated data, one row is composed of 172 bytes of data D0~D171 and 10 bytes of column-direction parities D172~D181. As shown in the figure, one sector of data comprises 12 rows of data and one row of row-direction parities.

An array of 182 bytes in the column direction×202 rows in the row direction is obtained by collecting 16 sectors of the demodulated data. Although one sector has 13 rows, these 13 rows comprise 12 rows of data and one row of parities, as described above. So, when collecting 16 sectors of demodulated data, to connect one sector of 13 rows with the next one sector of 13 rows results in a format in which the data and the row-direction parities data coexist at equal intervals. This means that interleaving performed to the row-direction parities is not released (i.e., the row-direction parities are not deinterleaved) and, in order to obtain an error correction array, deinterleaving is required to collect the row-direction parities at the bottom of the array.

FIG. 2(c) shows a format in which the row-direction parities have been deinterleaved, and this is an error correction array to be subjected to error correction. As shown in FIG. 2(c), data D0~D2183 shown in FIG. 2(b) are arranged in 12 rows from the upper edge of the array, and row-direction parities D2184~D2335 are arranged in the 193rd row. In this way, the row-direction parities are arranged from the 193rd row to the 108th row in the array of FIG. 2(c). More specifically, in the array of 182 bytes×208 bytes shown in FIG. 2(c), part of 172 bytes×192 bytes is a storage area of main data, part of 10 bytes×192 bytes is an area of column-direction parity, part of 172 byte ×16 byte is an area of row-direction parity, and part of 10 bytes×16 bytes is an area of row and column direction parity.

A description is now given of storage of data to the DRAM 16 shown in FIG. 1, with reference to FIG. 3.

As described above, the DRAM 16 has a column address length of 9 bits (512 bytes) and a row address length of 8 bits (256 rows). In this first embodiment, as shown in FIG. 3, 16 (i) pieces of storage blocks are arranged in the column direction, and each storage block has 32 (k) bytes in the column direction. One row of data shown in FIGS. 2(a)–2(c) are stored in each storage block. Since one row of data is composed of 182 (n) bytes, the size of each storage block is 32 (k) bytes in the column direction×6 (n/k) rows in the row direction. Since 182=32×5+22, 32 bytes of data are stored in 5 rows from the uppermost row of the storage block, and 22 bytes of data are stored in the lowermost row.

In this first embodiment, 182 bytes of data stored in one storage block are called "one data block" and, as shown in FIG. 3, 16 blocks from data block 0 to data block 15 are respectively stored in the 16 storage blocks arranged in the column direction of the DRAM. Accordingly, data block 0 is stored in the storage block positioned at column addresses 0~32 and addresses 0~5, data block 1 is stored in the storage block positioned at column address 33~63 and row addresses 0~5, . . . . , and data block 15 is stored in the storage block positioned at column addresses 479~511 and row addresses 0~5. After the 16 data blocks are stored in the column direction, the next data block 16 is stored in the storage block positioned at column addresses 0~32 and row addresses 6~11.

Furthermore, in this first embodiment of the invention, as shown in FIG. 3, the 1M-bit DRAM is divided into three parts to be used as first to third planes for ECC (ECC1~ECC3 in the figure). One error correction array is stored in each plane. The first plane (ECC1) corresponds to row addresses 0~77, the second plane (ECC2) corresponds to row address 78~155, and the third plane (ECC3) corresponds to row addresses 156~. Since one error correction array has 208 (m) rows and 16 (i) blocks (per row) in the column direction, 13 (m/i) blocks are arranged in the row direction in each of the first to third ECC planes The counters, offset generation circuits, and adders included in the storage address generation means 100 operate as follows to perform the storage as described above.

The base-32 counter 3 is used for counting 32 (k) bytes of data in the column direction of the storage block. This counter 3 counts the bytes of input data indicated by the transfer start signal output from the DRAM access arbitration circuit 10 according to the base-32 notation and, when there is a carry, the counter 3 outputs a signal indicating the carry (hereinafter referred to as a carry signal) to the base-6 counter 4. The results from the base-32 counter 3 are reference column address values indicating the storage positions in the column direction within the storage block.

The base-6 counter 4 is used for counting the rows in the storage block, and it counts the carries generated in the base-32 counter 3 according to the base-6 notation. The results from the base-6 counter 4 are reference row address values indicating the storage positions in the row direction within the storage block.

The base-182 counter 5 is used for counting the data (n-182) in the column direction, included in one row in the error correction array, i.e., the data included in one storage block. This counter 5 counts the bytes of input data indicated by the transfer start signal according to the base-182 notation and, when there is a carry, it outputs a carry signal to the base-16 counter 6.

The base-16 counter 6 is used for counting the 16 (i) blocks arranged in the column direction, and it counts the carries output from the base-182 counter 5 according to the base-16 notation. When a carry is generated in the base-16 counter 6, it outputs a carry signal to the base-13 counter 7. Further, the results from the base-16 counter 6 are used for generation of column address offset values, which is described later.

The base-13 counter 7 is used for counting the 13 (m/i) blocks arranged in the row direction, and it counts the carries output from the base-16 counter 6 according to the base-13 notation. The results from the base-13 counter 7 are used for generation of row address offset values, which is described later.

The column address offset value generation circuit 11 generates column address offset values which specify origins (in the column direction) of the respective storage blocks each having 32 bytes in the column direction. This circuit 11 receives the count value held by the base-16 counter 6, and multiplies the count value by 32 to generate a column address offset value. Accordingly, there are 16 column address offset values, 0, 32, 64, . . . , 480, corresponding to the count values 0~15 from the base-16 counter 6, and these values are column address values indicating the origins in the column direction of the storage blocks in which data blocks 0~15 shown in FIG. 3 are stored.

The row address offset value generation circuit 12 generates row address offset values which specify origins (in the row direction) of the respective storage blocks each having 6 rows in the row direction. This circuit 12 receives the count value held by the base-13 counter 7, and multiplies the count value by 6 to generate a row address offset value. Therefore, there are 13 row address offset values in the ECC1 plane shown in FIG. 3, i.e., 0, 6, 12, . . . , 72 corresponding to the count values 0~13 output from the base-13 counter 7, respectively, and these vales are row address values indicating the origins in the row direction of the storage blocks in which data blocks 0, 16, 32, . . . shown in FIG. 3 are stored.

In the column address adder 13 serving as column address generation means, a column address offset value indicating the origin of a storage block in the column direction is added to a reference column address value indicating a storage position in the column direction in the storage block, thereby generating a column address indicating a storage position wherein data is to be stored.

In the row address adder 14 serving as a row address generation means, a row address offset value indicating the origin of a storage block in the row direction is added to a reference low address value indicating a storage position in the row direction in the storage block, thereby generating a row address indicating a storage position where data is to be stored.

As described above, the DRAM 16 (FIG. 1) has three ECC planes each having an error correction array (FIG. 3).

The ECC1 plane starts from column address 0 and row address 0, the ECC2 plane starts from column address 0 and row address 78, and the ECC3 plane starts from column address 0 and row address 156. Accordingly, storage of data in the ECC1 plane is instructed by address generation in which generation of row address offset values in the row address offset value generation circuit 12 starts from 0. Further, storage of data in the ECC2 plane or the ECC3 plane shown in FIG. 3 is performed according to addresses which are generated by that generation of the row address offset values in the row address offset value generation circuit 12 starts from 78 or 156.

The CPU disposed outside the data storage unit instructs which ECC plane is to be used. This instruction is transmitted by a switching instruction signal S120 input to the row address offset value generation circuit 12 shown in FIG. 1. When the count value obtained from the base-13 counter 7 is 0, the row address offset value generation circuit 12 selects one of 0, 78, and 156 according to the signal S120, thereby generating a row address offset value indicating the origin of storage blocks in the specified plane.

Hereinafter, a description is given of the operation of the data storage unit of this first embodiment when data are stored in the DRAM 16, with respect to "A. Setup for storage", "B. Storage of one block of data", and "C. Storage from block to block".

A. Setup for Storage

Figure 4:
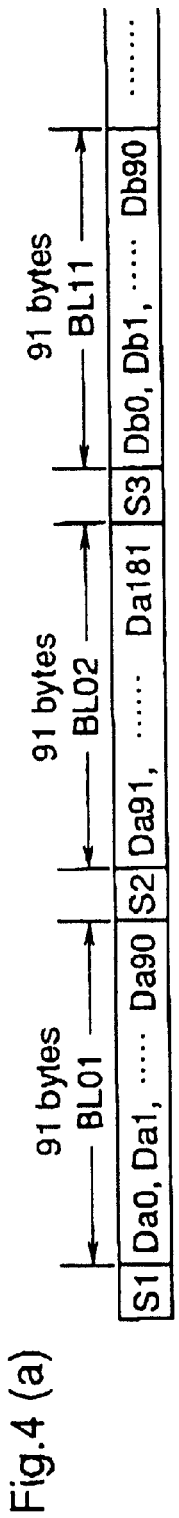
FIGS. 4(a) and 4(b) are diagrams for explaining the input data according to the first embodiment.
Figure 4:
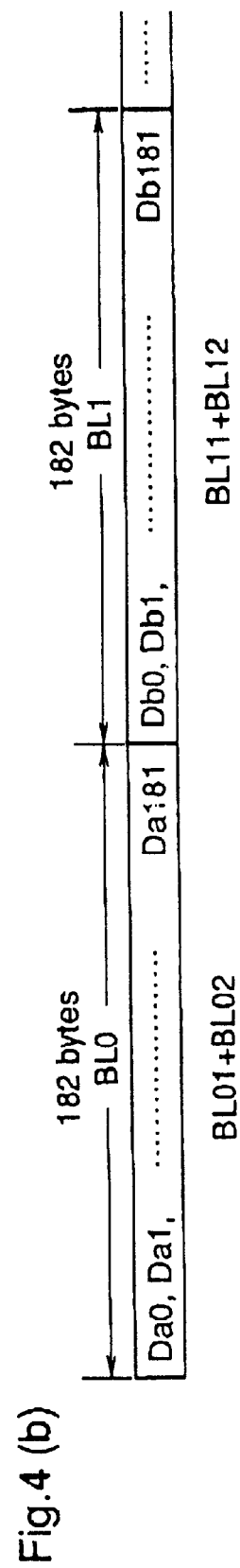

FIGS. 4(a) and 4(b) are diagrams for explaining data to be input to the data storage unit according to the first embodiment. FIG. 4(a) shows data including data sync bytes, to be input to a decoder including a data storage unit according to the first embodiment. As shown in the figure, these data are input in the following order: the first data sync byte S1, 91 bytes of data (Da0, Da1, . . . , Da90) included in group BL01, the second data sync byte S2, 91 bytes of data (Db0, Db1, . . . , Db90) included in group BL02, . . . FIG. 4(a) corresponds to FIG. 2(a). That is, data Da0, Da1, . . . , Da181 shown in FIG. 4(a) correspond to data D0, D1, . . . , D181 shown in FIG. 2(a), and Db0, Db1, . . . , Db181 correspond to D182, D183, . . . , D363, respectively.

The data sync bytes are deleted by data sync byte detection means (not shown) included in the decoder. At this time, the data sync byte detection means outputs data sync byte detection signals S20 to the counter preset value generation circuit 2 included in the data storage unit, and the counter preset value generation circuit 2 counts the data sync byte detection signals S20 to count the data sync bytes.

Since the data sync bytes are deleted by the data sync byte detection means, data having no data sync bytes as shown in FIG. 4(b) are successively input to the data storage unit. As shown in FIG. 4(b), the input data comprise a block BL0 including 182 bytes of data (Da0, Da1, . . . , Da181), a block BL1 including 182 bytes of data (Db0, Db1, . . . , Db181), . . . which have been included in the groups B01 and B02 shown in FIG. 4(a), respectively.

Prior to the data input, an ECC transfer start signal S10, which indicates that one array of error correction data is to be input, is input to the data storage unit through the ECC transfer start signal input terminal 1. This signal is supplied from the CPO or the like as described above. The ECC transfer start signal S10 is input to the counter preset value generation circuit 2. On receipt of the signal S10, the counter preset value generation circuit 2 generates counter preset signals S1~S25 for initializing the base-32 counter 3, the base-6 counter 4, the base-182 counter 5, the base-16 counter 6, and the base-13 counter 7, and outputs these signals to the respective counters, whereby the count values of the respective counters are initialized to 0.

On receipt of the data, the FIFO buffer 9 outputs a transfer request signal S91 indicating that data transfer is requested, to the DRAM access arbitration circuit 10. On receipt of the transfer request signal S91, the DRAM access arbitration circuit 10 outputs a transfer acknowledge signal S104 to another block outside the unit, and performs arbitration about the access right to the DRAM 16 on receipt of a transfer request signal S110 from the block. When transfer of the data stored in the FIFO buffer 9 is allowed, the DRAM access arbitration circuit 10 outputs a transfer acknowledge signal S105 to the FIFO buffer 9. On receipt of the transfer acknowledge signal S105, the FIFO buffer 9 outputs the data to the DRAM access arbitration circuit 10.

B. Storage of One Block of Data

Figure 5:
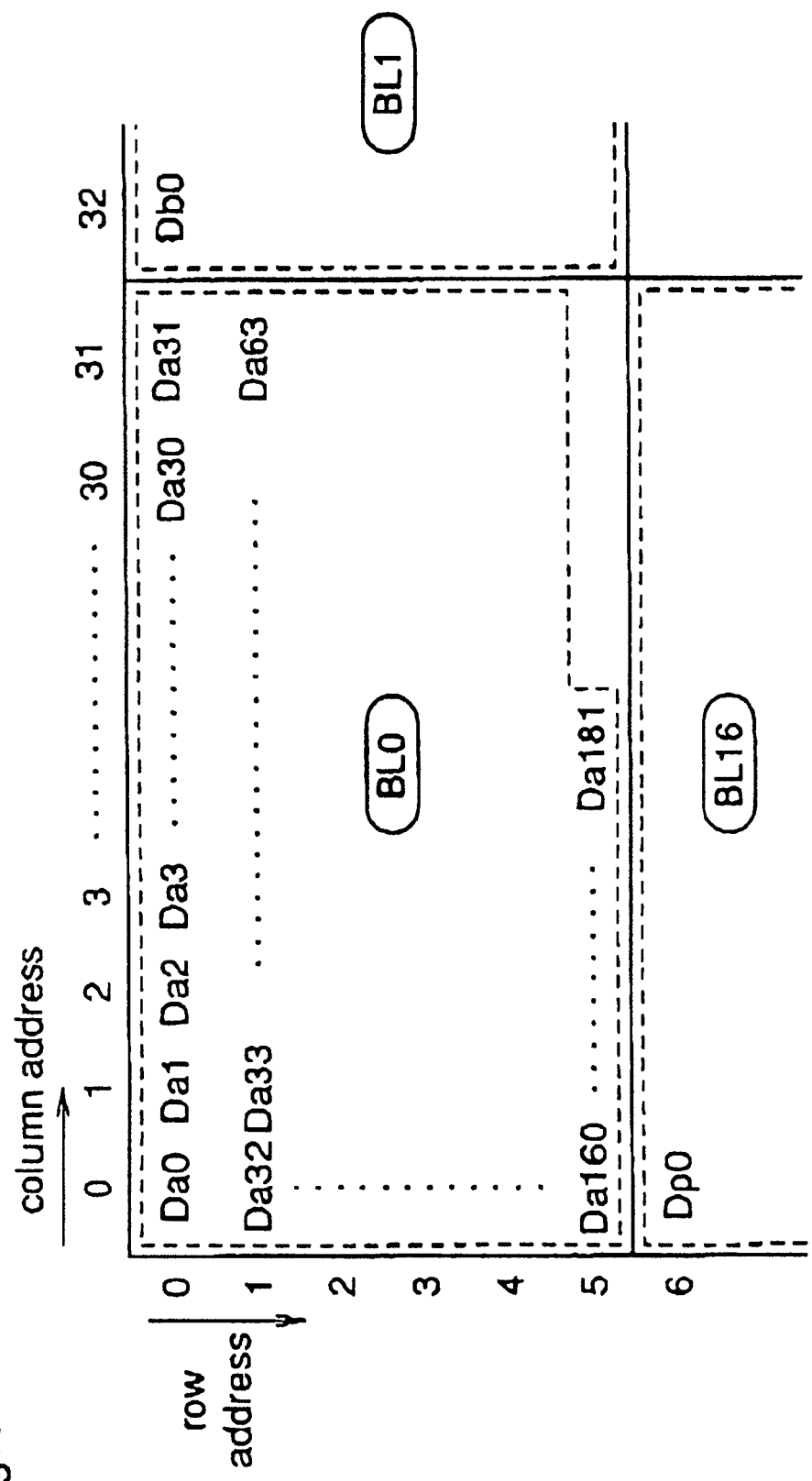
FIG. 5 is a diagram for explaining storage of one block (storage unit) of data into one storage block, according to the first embodiment.

A description is given of storage of 182 bytes of data Da0~Da181 included in the first block 0, i.e., the block BL0 shown in FIG. 4(b), with reference to FIG. 5. FIG. 5 is a diagram for explaining storage of one block of data (a unit of storage) into one storage block in the DRAM 16.

Initially, in the storage address generation means 100, a storage address indicating the storage position for the 0th data Da0 is generated.

To be specific, the column address offset value generation circuit 11 obtains the count value S61 held by the base-16 counter 6, multiplies this value by 32 to generate a column address offset value S111, and outputs it to the column address adder 13. Since the count value S61 has been initialized to 0, the result of the multiplication is also 0, and 0 is output as the column address offset value S111 to the column address adder 13. In the column address adder 13, the column address offset value S111 (=0) is added to the count value S31 (=initial value 0) obtained from the base-32 counter 3 (reference column address value), and a column address S130 (=0) obtained as the result of the addition is output to the DRAM control timing generation circuit 15.

On the other hand, the row address offset value generation circuit 12 obtains the count value S71 held by the base-13 counter 7, and multiplies this value by 6 to generate a row address offset value S121 to be output to the row address adder 14. Since the count value S71 has been initialized to 0, the result of the multiplication is also 0, and 0 is output as the row address offset value S121 to the row address adder 14. In the row address adder 14, the row address offset value S121 (=0) is added to the count value S41 (=initial value 0) obtained from the base-6 counter 4 (reference row address value), and a row address S140 (–0) obtained as the result of the addition is output to the DRAM control timing generation circuit 15.

When the data Da0 is input to the DRAM access arbitration circuit 10, the DRAM access arbitration circuit 10 generates a data transfer start signal S101 to be output to the DRAM control timing generation circuit 15 together with the 1-byte data Da0. The DRAM control timing generation circuit 15 receives the column address S130 and the row address S140 from the column address adder 13 and the row address adder 14, respectively, as the addresses where the data is to be stored. Since both the column address S130 and the row address S140 are 0, the data is to be stored at column address 0 and row address 0.

Then, the DRAM control timing generation circuit 15 generates a timing of access to the DRAM 16, and designates the column address and the row address, according to the timing, with designating the address type (row or column) by the RAS signal or the CAS signal. That is, the DRAM control timing generation circuit 15 outputs the data Da0, a signal S131 indicating the column address, a signal S141 indicating the row address, and a signal S151 indicating the address type (RAS signal or CAS signal), to the DRAM 16. Thereby, as shown in FIG. 5, the 1-byte data Da0 is stored at column-address 0 and row-address 0 in the DRAM 16.

From the DRAM access arbitration circuit 10, data transfer start signals S102 and S103 identical to the above-described signal S101 are output to the base-32 counter 3 and the base-182 counter 5, respectively. In response to the data transfer start signals, the base-32 counter and the base-182 counter 5 increment their count values by +1. In this case, the count values held by the base-32 counter 3 and the base-182 counter 5 are incremented by +1, namely, from 0 to 1. With respect to the other counters, the count values remain at 0. Thereafter, in the storage address generation means 100, generation of storage addresses for the next data Da1 is carried out.

The column address offset value generation circuit 11 obtains the count value S61 held by the base-16 counter 6, and multiplies this value by 32 to generate a column address offset value S111 to be output to the column address adder 13. Since the count value remains at 0, the result of the multiplication is also 0, and 0 is output as the column address offset value S111 to the column address adder 13. In the column address adder 13, the column address offset value S111 (=0) is added to the count value S31 (=1) obtained from the base-32 counter 3 (reference column address value), and a column address S130 (=1) obtained as the result of the addition is input to the DRAM control timing generation circuit 15.

On the other hand, the row address offset value generation circuit 12 obtains the count value S71 held by the base-13 counter 7, and multiplies this value by 6 to generate a row address offset value S121 to be output to the row address adder 14. Since the count value S71 remains at 0, the result of the multiplication is also 0, and 0 is output as the row address offset value S121 to the row address 14. In the row address adder 14, the row address offset value S121 (=0) is added to the count value S41 (=0) obtained from the base-6 counter 4 (reference row address value), and a row address S140 (=0) obtained as the result of the addition is output to the DRAM control timing generation circuit 15.

When the 1-byte data Da1 which follows the data Da0 is input to the DRAM access arbitration circuit 10, the DRAM access arbitration circuit 10 generates a data transfer start signal S101 to be output to the DRAM control timing generation circuit 15 together with the 1-byte data Da1. The DRAM control timing generation circuit 15 stores the 1-byte data Da1 at column-address 1 and row-address 0 in the DRAM 16 as described for the case of the data Da0 (FIG. 5).

The data from Da2 to Da31 are subjected to the same processing as that for the data Da1 to be stored at column addresses 2~31 and row address 0, respectively. As shown in FIG. 5, the data Da1~Da31 are stored in the storage positions specified by the above-mentioned column addresses and row addresses and, in this storage block, the respective columns in one row indicated by row address 0 are filled with the data.

When transferring the data Da31, like the case of transferring the data Da0, transfer start signals S102 and S103 are output from the DRAM access arbitration circuit 10 to the base-32 counter 3 and the base-182 counter 5, respectively. On receipt of the transfer start signal, the base-182 counter 5 performs count-up to increment the count value by +1, namely, from 31 to 32. On the other hand, since the base-32 counter 3 counts according to the base-32 notation, it resets the count value 31 to 0 in response to the signal S102 and outputs a carry signal S32 to the base-6 counter 4. The base-6 counter 4 performs count-up to increment the count value by +1 in response to the carry signal S32, whereby the count value 0 of the base-6 counter 4 becomes 1. Thereafter, generation of a storage address for the next data Da32 is carried out.

The column address offset value generation circuit 11 obtains the count value S61 held by the base-16 counter 6, and multiplies this value by 32 to generate a column address offset value S111 to be output to the column address adder 13. Since the count value S61 remains at 0, the result of the multiplication is also 0, and 0 is output as the column address offset value S111 to the column address adder 13. In the column address adder 13, the column address offset value S111 (=0) is added to the count value S31 (=0) obtained from the base-32 counter 3 (reference column address value), and a column address S130 (=0) obtained as the result of the addition is input to the DRAM control timing generation circuit 15.

On the other hand, the row address offset value generation circuit 12 obtains the count value S71 held by the base-13 counter 7, and multiplies this value by 6 by generate a row address offset value S121 to be output to the row address adder 14. Since the count value S71 remains at 0, the result of the multiplication is also 0, and 0 is output as the row address offset value S121 to the row address adder 14. In the row address adder 14, the row address offset value S121 (=0) is added to the count value S41 (=1) obtained from the base-6 counter 4 (reference row address value), and a row address S140 (=1) obtained as the result of the addition is output to the DRAM control timing generation circuit 15.

On receipt of the data Da32, the DRAM access arbitration circuit 10 generates a data transfer start signal S101 to be output to the DRAM control timing generation circuit 15 together with the 1-byte data Da32. The DRAM control timing generation circuit 15 receives the column address S130 and the row address S140 from the column address adder 13 and the row address adder 14, respectively, as addresses where the data Da32 is to be stored. Since the column address S130 shows 0 and the row address S140 shows 1, the data Da32 is to be stored at column address 0 and row address 1. Then, as shown in FIG. 5, the 1-byte data Da32 is stored at column address 0 and row address 1 in the DRAM 16.

The data from the 33rd data Da33 through the 63rd data Da63 are subjected in the same processing as that for the 32nd data Da32, and these data are stored at column addresses 1~31 and row address 1. As shown in FIG. 5, these data are stored in the respective columns in one row indicated by row address 1.

Likewise, as the base-6 counter 4 is incremented 1 by +1 from 2 to 6, data Da64~Da95, data Da96~Da127, and data Da128~Da159 are stored in the respective columns in rows indicated by row addresses 2~4, respectively, and data Da160~Da181 are stored in the columns up to the middle of one row indicated by row address 5. The 182 bytes of data in the uppermost row shown in FIG. 2(b) are input to the data storage unit as the BL0 data shown in FIG. 4(b) to be stored in the DRAM 16 as shown in FIG. 5.

C. Storage from Block to Block

When the data following the BLO1 and BLO2 shown in FIG. 4(a) (Db0~) are input to the decoder including the data storage unit of this first embodiment, the data sync byte S3 positioned at the beginning is the third data sync byte as a whole. As described above, the counter preset value generation circuit 2 of this first embodiment counts the data sync bytes by using the data sync byte detection signals S20. The counter preset value generation circuit 2 is set so as to reset the base-32 counter 3 and the base-6 counter 4 when receiving the data sync byte detection signals S20 in odd numbers. The reason is as follows. Although the data sync bytes are inserted at intervals of 91 bytes as shown in FIG. 4(a), since the data storage unit of this first embodiment performs data processing in units of 182 bytes, it performs reset in response to the data sync bytes in odd numbers. Accordingly, when the counter preset value generation circuit 2 receives the data detection signal S20 corresponding to the data sync byte S3, it outputs counter preset signals S21 and S22 instructing initialization to the base-32 counter 3 and the base-6 counter 4, respectively. Although the base-32 counter 3 and the base-4 counter 4 hold 20 and 5, respectively, these count values are initialized to 0 according to the signals S21 and S22.

When transferring the last data Da181 in the block 0, the base-182 counter 5 receives the transfer start signal S103 and counts it according to the base-182 notation. Therefore, in the count-up operation to increment the count value by +1, the base-182 counter 5 resets the count value 181 to 0 and outputs a carry signal S51 to the base-16 counter 6. On receipt of the carry signal S51, the base-16 counter 6 performs count-up to increment the count value by +1, whereby the count value 0 becomes 1.

Accordingly, the count values of the respective counters are as follows: base-32 counter 3 . . . 0, base-6 counter 4 . . . 0, base-182 counter 5 . . . 0, base-16 counter 6 . . . 1, and base-13 counter 7 . . . 0. In this state, storage addresses for data Db0, which follows the data Da181, are generated.

The column address offset value generation circuit 11 obtains the count value S61 held by the base-16 counter 6, and multiplies this value by 32 to generate a column address offset value S111 to be output to the column address adder 13. Since the count value S61 is 1, 32 is input to the column address adder 13 as the column address offset value S111. In the column address adder 13, the column address offset value S111 (=32) is added to the count value S31 (=0) obtained from the base-32 counter 3 (reference column address value), and a column address S130 (=32) obtained as the result of the addition is input to the DRAM control timing generation circuit 15.

On the other hand, the row address offset value generation circuit 12 obtains the count value S71 from the base-13 counter 7, and multiplies this value by 6 to generate a row address offset value S121 to be output to the row address adder 14. Since the count value S71 remains at 0, the result of the multiplication is also 0, and 0 is output as the row address offset value S121 to the row address adder 14. In the row address adder 14, the row address offset value S121 (=0) is added to the count value S41 (=initial value 0) obtained from the base-6 counter 4 (reference row address value), and a row address S140 (=0) obtained as the result of the addition is output to the DRAM control timing generation circuit 15.

On receipt of the 182nd data Db0, the DRAM access arbitration circuit 10 outputs this 1-byte data Db0 and a data transfer start signal S101 to the DRAM control timing generation circuit 15. The DRAM control timing generation circuit 15 receives the column address S130 and the row address S140 from the column address adder 13 and the row address adder 14, respectively, as addresses where the data Db0 is to be stored. Since the column address S130 shows 32 and the row address S140 shows 0, the data Db0 is to be stored at column address 32 and row address 0. Then, this 1-byte data Db0 is stored at column address 32 and row address 0 in the DRAM 16 (FIG. 5).

Thereafter, as the base-32 counter 3 is increased '1 by +1, the data Db0~Db31 included in the block BL1 are stored in one row indicated by row address 0 in the storage block, i.e., column address 32 through 63, like the data Da0~Da31 included in the block BL0. Thereafter, as the base-6 counter 4 is incremented +1 by +1 from 2 to 6 in accordance with the carry signal S32 output from the base-32 counter 3, the subsequent data Db64~Db95, Db96~Db127, and Db128~Db159 are stored in the respective columns having column addresses 32 through 63 in the respective rows having row addresses 2~4, and the residual data Db160~Db181 in the block BL1 are stored in the columns in part of one row indicated by row address 5.

FIG. 3 is a memory map showing this storage state. The first 182 bytes of data, which have been described in the section of "B. Storage of one block of data", are stored as data block 0 in the storage block located in column addresses 0~31 and row addresses 0~5. The next 182 bytes of data are stored as data block 1 in the storage block located in column addresses 32~6331 and row addresses 0~5. Thereafter, data blocks 2~15 are stored in similar manner.

As described above, every time 182 types of data which are continuous in the transverse direction (FIG. 2(b)), i.e., one block of data shown in FIG. 3, are transferred, the base-182 counter 5 outputs the carry signal S51 to the base-16 counter 6, whereby the count value of the base-16 counter 6 is incremented +1 by +1. When the block 15 is stored, the base-16 counter 6 holds the count value 15. When a carry is generated in the base-182 counter 5 as the data storage to the block 15 has been completed, the base-182 counter 5 outputs a carry signal 51 to the base-6 counter 6. Since the base-6 counter 6 counts according to the base-6 notation, on receipt of the carry signal 51, the counter 6 resets the count value 15 to 0 and outputs a carry signal S62 to the base-13 counter 7. On receipt of the carry signal S62, the count value 0 of the base-13 counter 7 becomes 1.

After the data of blocks 0~15 have been stored, the next address generation is carried out as follows. The row address offset value generation circuit 12 generates a row address offset value by multiplying the count value S71 obtained from the base-13 counter 7 by 6, and outputs it to the row address adder 14. Since the count value S71 is 1 as described above, the row address offset value S121 input to the row address adder 14 is 6. Accordingly, in the row address adder 14, the row address offset value S121 (=6) is added to the count value S61 (=initial value 0) of the base-6 counter 4, thereby generating 6 as a row address S140.

On the other hand, a column address is generated as follows. Since the base-32 counter 3 holds the count value which has been initialized to 0 by the counter preset signal S21 corresponding to the third (odd number) data sync byte while the base-16 counter 6 holds 0 as described above, the column address offset value is 0 and, in the column address adder 13, the offset value S111 (=0) and the count value S31 (=0) are added, thereby generating 0 as a column address S130.

Therefore, the data block 16 which follows the data block 15 is stored in the storage block having row address 6 and column addresses 0~31. The next data block 17 and the subsequent blocks are successively storage in similar manner.

As described above, in the memory map shown in FIG. 3, three planes of error correction arrays are stored in the DRAM 16. Although the above description has been given of data storage in the ECC1 plane, data storage in the ECC2 or ECC2 plane is identical to that described above except the row address offset values.

As shown in FIG. 3, the data stored in the DRAM are subjected to ECC in the later stage. ECC included in a decoding process is performed in the following procedure.

(1) One code length of data to be subjected to syndrome operation are read from the DRAM. One column or one row in the array shown in FIG. 2(c) corresponds to one code length, and 182 bytes of data per column are read when the processing is carried out in the column direction while 208 bytes of data per row are read when the processing is carried out in the row direction.

(2) The read data corresponding to one code length are subjected to error correction and, when there is an error, values indicating the position and size of the error are obtained by arithmetic operation.

(3) By using the values so obtained, only the data corresponding to the error is read from the DRAM and, after predetermined error correction, the data is stored in the original storage position.

In the above-described procedure, access to DRAM for data reading in step (1) significantly influences the utilization ratio of the DRAM.

Hereinafter, a description is given of data reading by using the page mode when performing the syndrome operation in ECC, with reference to FIGS. 6 and 7. FIGS. 6(a) and 6(b) are diagrams for explaining data reading when performing the syndrome operation in the ECC. FIG. 7 is a memory map corresponding to FIG. 3, showing storage of data according to the prior art.

FIG. 6(a) shows an error correction array having the same format as FIG. 2(c). In FIG. 6(a), reference numerals 601 and 602 show the directions of data access in the syndrome operation. As shown in the figure, when performing the syndrome operation in the column direction, access is made in the column direction shown by 601, whereby data D0, D1, . . . are read. On the other hand, when performing the syndrome operation in the row direction, access is made in the row direction shown by 602, whereby data D0, D182, . . . are read.

The operation of the DRAM control timing generation circuit 15 depends on whether the page mode is used or not. That is, when data is input to or output from the DRAM without using the page mode, it is required that the row-direction addresses are enabled by the RAS signal at every input/output of data to input row addresses and next the column-direction addresses are enabled by the CAS signal to input column addresses. On the other hand, when data is input to or output from the DRAM using the page mode, after the row-direction addresses are enabled by the RAS signal to input row addresses, for the respective data in this row, the column addresses can be successively input with the cycle of the column-direction address enable by the CAS signal, whereby the cycle number can be reduced. Although it depends on the DRAM, when the page mode is not used, the cycle time required is several times as long as that in the case of using the page mode. Therefore, it is desirable for high efficiency that as many data to be read continuously as possible are stored in the same row in the DRAM so that the page mode can be used more frequently when reading the data from the DRAM.

FIG. 6(b) is a diagram for explaining the use of page mode when performing data access in the direction 601 or 602 shown in FIG. 6(a). As shown in the figure, when performing the syndrome operation in the column direction, as the access along the direction 601, 1-byte data Da0~Da31 stored in one row indicated by the row address 0 in the block 0 can be read by using the page mode. Accordingly, 32 times of readings in the page mode can be achieved. Further, when performing the syndrome operation in the row direction, as the access along the direction 602 shown in FIG. 6(b), data Da0, Db0, . . . (shown by black dots in the figure) positioned at the beginnings of the blocks 0~15 can be read by using the page mode. Therefore, 16 times of readings in the page mode can be achieved. If parallel processing is possible in the syndrome operation, it is possible to use the page mode for reading data of 16×number of parallels in the row direction, or 32×number of parallels in the column direction. The maximum number of parallels is 32 in the row direction and 16 in the column direction.

FIG. 7 is a diagram illustrating a memory map in the case where input data are successively stored in the same DRAM in the prior art decoding process, to be compared with the first embodiment of the invention. As shown in the figure, 512 pieces of 1-byte data from the 0th data to the 511th data are successively stored in the column direction, in positions indicated by row address 0 and column addresses 0~511. When reading the data which have been stored in the column direction alone as shown in FIG. 7, although the page mode can be frequently used in the column direction, it cannot be frequently used in the row direction. In the storage state shown in FIGS. 6(a) and 6(b), 2.8 rows of data (512/182) are stored in one row of the DRAM. So, in the row having row address 0, two data are read by using the page mode and, therefore, the page mode is used only two times.

In the storage state achieved by the data storage unit of the present invention, the page mode can be frequently used in both the row direction and the column direction. So, in the correction array having product codes, the reading of data in the row direction and the reading of data in the column direction are performed equally, whereby the performance can be improved as a whole. Especially when performing the arithmetic operation in the order of row-direction→column-direction→row-direction, delays in the row-direction processing adversely affect the performance in the storage state according to the prior art, and the efficiency is considerably reduced as a whole. Consequently, the effect of this first embodiment to improve the efficiency in the storage state is remarkable.

As described above, the data storage unit according to the first embodiment of the invention is equipped with the counter preset value generation circuit 2, the storage address generation means 100, and the DRAM control timing operation circuit 15. Thereby, data are stored in the DRAM 16 according to a format which enables frequent use of the page mode in both the row direction and the column direction when reading the data, whereby processing efficiency is improved in the subsequent ECC for the stored data. More specifically, according to the data storage process itself is increased as compared with that of the prior art storage unit which simply stores data, in the subsequent error correction or decoding which is executed with the same device resources as used for the storage unit, the device resources are efficiently used, resulting in high-speed processing. Especially in ECC using an array an array of product codes, since the burden in the syndrome operation is considerable, the effect of reducing the burden in ECC is remarkable.

When the data storage unit of this first embodiment is used for a process in which a processing speed as high as that in the prior art unit is required, the power consumption as a system can be reduced by minimizing the frequency of processing clock.

While in this first embodiment emphasis has been placed on storage of data to be subjected to ECC into the DRAM, it is also possible to implement an array similar to the error correction array by performing address generation for the result of the error correction in like manner as described above. Also in this case, the page mode can be frequently used in the subsequent processing to improve the efficiency.

In the first embodiment of the invention, the data storage unit includes the column address offset value generation circuit 11 and the row address offset value generation circuit 12 to specify a storage block in the DRAM 16, and an offset value generated as the result of multiplication by these circuits 11 and 12 is used as an origin of the storage block. However, in place of the offset value generation circuits 11 and 12 performing such multiplication, a plurality of column address offset ROMs and a plurality of row address offset ROMs, each containing an offset value, may be employed as offset value generation means. In this case, the column address offset value generation means comprises sixteen ROMs containing values of 0, 32, 64, . . . , 480, respectively, and the row address offset value generation means comprises 39 ROMs in total, made up as follows: 13 ROMs for the ECC1 plane, containing values of 0, 6, 12, . . . , 72; 13 ROMs for the ECC2 plane, containing values of 78, 84, . . . , 150; and 13 ROMs for the ECC3 plane, containing values of 156, 162, . . . , 228. These offset value generation means are used by reading the value of an appropriate ROM according to the count value S61 of the base-16 counter and the count value S71 of the base 13-counter. Therefore, multiplication by the offset value generation circuit of the first embodiment is dispensed with, and equivalent address generation is achieved without using a multiplier or the like.

Further, when offset value generation means is implemented by offset ROMs as described above, the following effect is achieved in IC design using HDL (Hardware Description Language) which has recently been propagated. That is, when extending the circuit to the gate level by logical composition using tools, based on function description of the circuit, it is possible to described the offset ROMs as a data table format in the function description of the circuit, whereby the IC circuit having functions equal to those of the circuit comprising offset ROMs is realized. Accordingly, when the circuit is so designed, multipliers and ROMs are not required.

Furthermore, an error correction array according to the first embodiment has a format of 182 bytes in the column direction ×208 rows in the row direction, and this is stored in a 1M-bit DRAM having 512 bytes ×256 rows. In this case, the DRAM is divided into 16 storage blocks in the column direction so that each block has 32 bytes in the column direction, and three arrays are stored in the DRAM as shown in FIG. 3. However, this is merely an example, and the present invention can deal with arrays of various formats. Further, the number of planes where arrays are stored may be other than three, according to a process using the array. Generally, when an array having a format of n bytes in the column direction×m rows in the row direction is stored in a DRAM so that it is divided into i blocks each having k bytes in the column direction, the same data storage as described for the first embodiment is realized by employing a base-k counter as the base-32 counter 3, a base-n counter as the base-6 counter 4, a base-n counter as the base-182 counter 5, a base-i counter as the base-16 counter 6, and a base-m/i counter as the base-13 counter 7.

Embodiment 2

A data transfer device according to a second embodiment of the present invention is a data storage unit which realizes an array for error correction in a decoding process, in the storage state of a DRAM and, further, this data storage unit can cope with the case where defects occur in the input data.

The first embodiment of the invention is described on the premise that the input data has no defects. That is, data shown in FIG. 2(a) are successively input in groups each comprising a synchronous byte and 91 bytes of data as shown in FIG. 4(a).

However, there is a possibility that data defects occur due to some cause in reading or transmission and thereby the 91 bytes of data are not smoothly input. As described above, the prior art decoder copes with such case by performing interpolation in the FIFO buffer, i.e., by detecting the amount of defects and generating dummy data to be inserted. In contrast with the prior art, this second embodiment of the invention copes with such case by storage of data after the defects, into the DRAM 16, without performing such interpolation in the FIFO buffer 9. To be specific, the data storage unit of this second embodiment performs, when generating addresses, data storage position correction for detecting the storage position where the data following the data sync byte is to be stored originally. Therefore, even when the input data have defects, a greater part of the data after the defects can be stored in positions where the data should be stored originally.

Since the structure of the data storage unit of this second embodiment is identical to that of the first embodiment, FIG. 1 is used to describe the second embodiment. In the data storage unit of this second embodiment, generation and output of preset values by the counter preset value generation circuit 2 are different from those of the first embodiment, and the counter preset value generation circuit 2 of this second embodiment performs correction of data storage positions according to the data sync bytes. To be specific, the counter preset value generation circuit 2 is identical to that of the first embodiment in that it performs initialization of each counter to reset the count of the counter to 0, and that it counts the data sync byte detection signal S20. In this second embodiment, however, the counter preset value generation circuit 2 generates values to be output from the respective counters to generate addresses in the DRAM 16 where the data are to be stored originally, according to the count values obtained by counting the data sync byte detection signals S20, and outputs the generated values as preset values to the respective counters. That is, it functions as a count instruction means for controlling address generation in the storage address generation means 100 by specifying the count value.

Hereinafter, the operation of the data storage unit so constructed will be described with respect to storage of data in the DRAM 16.

It is assumed that the data shown in FIG. 4(a) are input to the storage unit, and the data Da0~Da90 included in the block BL01 are stored in the DRAM 16 in the same manner as described for the first embodiment. Then, the subsequent data are processed as follows.

The counter preset value generation circuit 2 knows where the detected data sync byte is placed from the beginning of the input data by using the count value which indicates the number of the data sync bytes and is obtained by counting the data sync byte detection signals S20, and thereby knows the byte number from the beginning of the data which follows the data sync byte. For example, the data sync byte detection signal S20 corresponding to the data sync byte S2 shown in FIG. 4(a) indicates the second data sync byte, and the counter preset value generation circuit 2 knows that the data Da91 which follows the data sync byte S2 is the 92nd data from the beginning of the input data (Da0=first data).

The counter preset value generation circuit 2 obtains addresses where the data is to be originally stored in the DRAM 16, and then obtains values to be output from the respective counters to generate the addresses. In the above-mentioned case, since column address 27 and row address 2 are obtained as the storage position for the data Da91, values to be output from the respective counters are as follows: the base-32 counter 3 . . . 27, the base-6 counter 4 . . . 2, the base-182 counter . . . 90, the base-16 counter 6 . . . 0, and the base-13 counter 7 . . . 0. Accordingly, the counter preset value generation circuit 2 generates counter preset signals S21~S25 indicating the preset values of the respective counters and outputs these signals to the counters, and the respective counters hold the values indicated by the signals S21~S25 as the count values.

When performing address generation for the data Da91, since the count value obtained from the base-16 counter 6 is 0, the column address offset value S111 generated by the column address offset value generation circuit 11 is 0. In the column address adder 13, this offset value S111 (=0) is added to the count value S31 (=27) obtained from the base-32 counter 3, whereby 27 is generated as the column address S130.

Further, since the count value obtained from the base-13 counter 7 is 0, the row address offset value S121 generated by the row address offset value generation circuit 12 is 0. In the row address adder 14, the offset value S121 (=0) is added to the count value S41 (=2) obtained from the base-6 counter 5, whereby 2 is generated as the row address S140.

Thereafter, as in the first embodiment of the invention, the data Da91 is stored in the correct position indicated by column address 27 and row address 2. The operation of this second embodiment is identical to that of the first embodiment except the storage position correction in accordance with the data sync byte detection. After the data Da91 has been stored, the subsequent data (Da91~) are successively stored to obtain the same storage results as shown in FIGS. 3 and 5.

In the data storage by the data storage unit of this second embodiment, event if there are defects in the 91 bytes of data Da0~Da90 which have been input prior to the data Da91, the data Da91 can be stored in the correct position. In this case, for the defects in the data (Da0~Da90) which have been previously stored, the previous data remaining in the DRAM 16 are used as dummy data, so that it is not necessary to detect the amount of defects and generate dummy data of the equivalent amount to fill the defects with the dummy data.

As described above, according to the second embodiment of the present invention, in addition to the structure of the data storage unit according to the first embodiment, the counter preset value generation circuit 2 has the function of correcting the data storage position. To be specific, the counter preset value generation circuit 2 obtains the position in the DRAM 16 where the data following the data sync byte is to be originally stored, in accordance with detection of the data sync byte included in the input data, and obtains the count values of the respective counters 3~8 so that these counters generate the addresses indicating the position, and instructs these counters to have the count values by using the counter preset signals. Therefore, in addition to the effect of the first embodiment, the storage unit can deal with defects in data without performing interpolation in the FIFO buffer. So, it is not necessary to increase the capacity of the FIFO buffer to avoid the influence of delays due to interpolation. Consequently, the data storage unit of this second embodiment can deal with defects in data without increasing the circuit scale and cost.

Embodiment 3

A data transfer device according to a third embodiment of the present invention is a data storage unit which uses input data that have been interleaved when subjected to error correction in a decoding process, and stores the input data in a format which has been deinterleaved to make deinterleaving in the subsequent process unnecessary.

Figure 8:
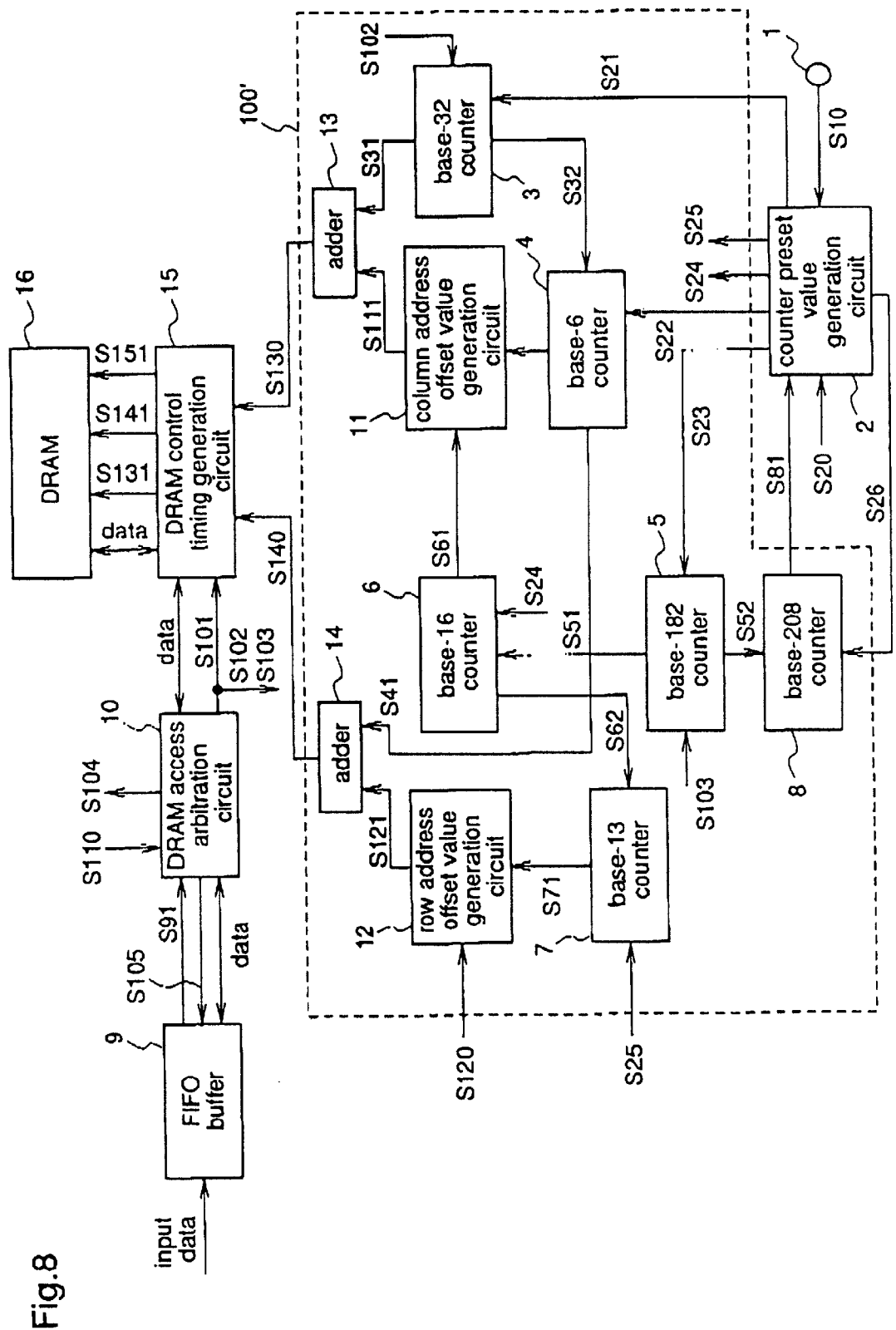
FIG. 8 is a block diagram illustrating a data storage unit according to a third embodiment of the present invention.

FIG. 8 is a block diagram illustrating a data storage unit according to the third embodiment of the present invention. As shown in FIG. 8, a data storage unit of this third embodiment includes a base-208 counter 8, in addition to the components of the first embodiment.

Figure 2:
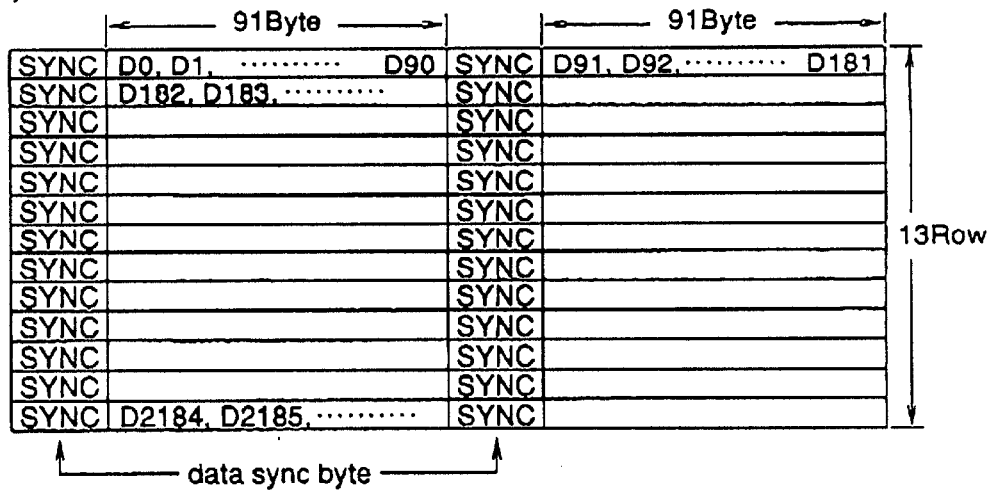
FIGS. 2(a)–2(c) are diagrams for explaining an error correction array used when the data to be processed in the first embodiment are subjected to ECC (Error Checking and Correction).
Figure 2:
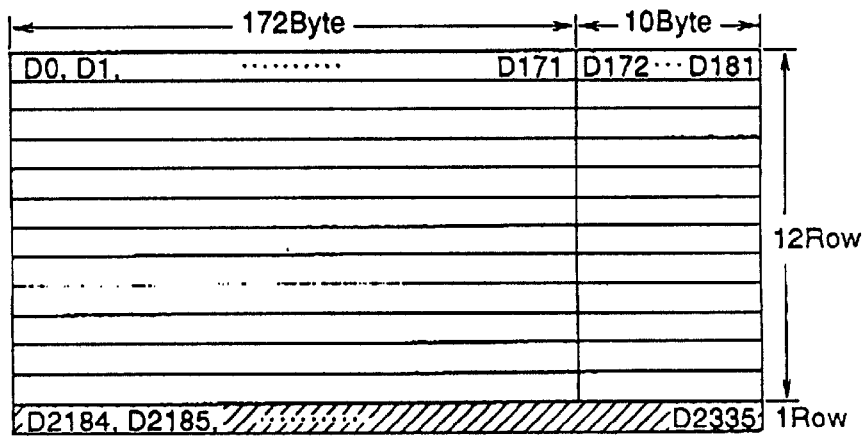
Figure 2:
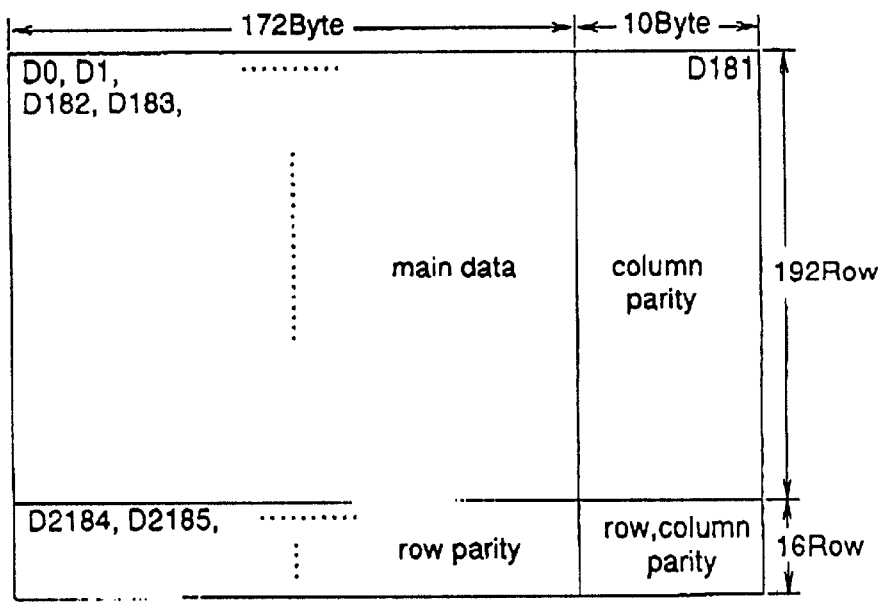
Figure 3:
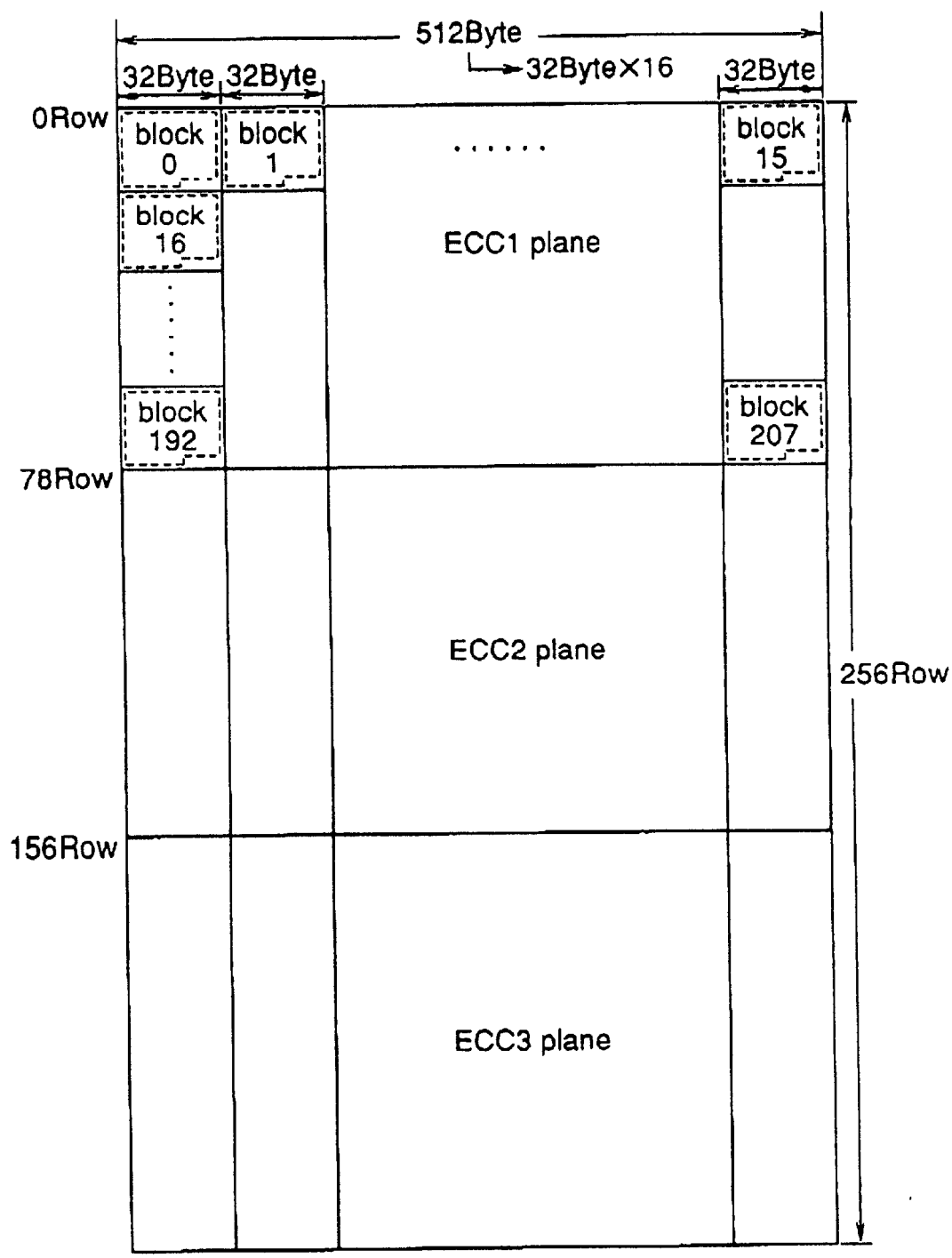
FIG. 3 is a memory map for explaining storage of data in a DRAM possessed by the data storage unit of the first embodiment.

The base-208 counter 8 counts the signal S52 indicating a carry generated in the base-182 counter 5 according to the base-208 (m) notation, thereby counting the rows wherein data to be processed currently are included, in the data structure of 182 bytes per row shown in FIG. 2. Further, when there is a carry, the base-182 counter 5 outputs a carry signal S51 to the base-16 counter 6 and a carry signal S52 to the base-208 counter 8.

The counter preset value generation circuit 2 outputs not only the signals S21~S25 which indicate the count values to be held by the respective counters as in the first embodiment, but also a counter preset signal S26 which indicate the count value to be held by the base-208 counter 8. Further, the counter preset value generation circuit 2 has a function corresponding to deinterleaving. That is, the counter preset value generation circuit 2 functions as count instruction means which receives the result of the count by the base-208 counter 8, obtains a storage position to realize deinterleaving by arithmetic operation according to the result of the count, and indicates a count value to each counter to control address generation in the storage address generation means 100'.

The ECC transfer start signal input terminal 1, the base-32 counter 3, the base-6 counter 4, the base-16 counter 6, the base-13 counter 7, the FIFO buffer 9, the DRAM access arbitration circuit 10, the column address offset value generation circuit 11, the row address offset value generation circuit 12, the column address adder 13, the row address adder 14, the DRAM control timing generation circuit 15 and the DRAM 16 are identical to those already described for the first embodiment and, therefore, do no require repeated description.

Hereinafter, the operation of the data storage unit so constructed will be described.

When an ECC transfer start signal S10 is supplied from the ECC transfer start signal input terminal 1 to the counter preset value generation circuit 2, the counter preset value generation circuit 2 outputs the counter preset signals S21~S25 indicating the initial value 0 to the respective counters 3~7, and the counter preset signal S26 indicating the initial value 0 to the base-208 counter 8.

Thereafter, the data storage unit performs, with data input, address generation and data storage in the same manner as already described for the first embodiment. So, a description is now given of deinterleaving by the data storage unit of this third embodiment.

As described for the first embodiment, the base-182 counter 5 carries the count every time 182 bytes of input data are transferred and, at this time, it outputs a carry signal S52 to the base-208 counter 8. On receipt of the carry signal S52, the base-208 counter 8 performs count-up to increment its count value by +1, and outputs a signal S81 indicating the count value to the counter preset value generation circuit 2.

When the count value indicated by the signal S81 is a multiple of 13, the counter preset value generation circuit 2 outputs the counter preset signals S21~S25 to make the counters 3~7 have predetermined count values. When the count value indicated by the signal S81 is (a multiple of 13)+1, the counter preset value generation circuit 2 outputs the counter preset signals S21~S25 to make the counters 3~7 have count values which have not been changed to the above-mentioned predetermined values.

To be specific, when the signal S81 becomes 13, the counter preset value generation circuit 2 outputs the signals S21~S25 indicating the following values to the respective counters: 0 to the base-32 counter 3, 0 to the base-6 counter 4, 0 to the base-16 counter 6, and 12 to the base-13 counter 7. The DRAM addresses generated by these count values are column values are column address 0 and row address 72.

When the signal S81 becomes 14, the counter preset value generation circuit 2 outputs the signals S21~S25 indicating the following values: 0 to the base-32 counter 3, 0 to the base-6 counter 4, 12 to the base-16 counter 6, and 0 to the base-13 counter 7. The DRAM addresses generated by these count values are column address 384 and row address 0.

According to the prior art data storage shown in FIG. 7, data D2184, D2185, . . . included in the row of the parities shown in FIG. 2(*b*) are simply stored after data D0~D2183. Therefore, even after 16 sectors of data shown in FIG. 2(*b*) have been stored, since the parities in the row direction are scattered, it is necessary to secure the storage position for the parities in ECC performed to the array shown in FIG. 2(C) or to rearrange the parities before ECC, resulting in an increase in processing burden.

In this third embodiment, since, in the input data, the row-direction parities are disposed after the 12 rows of 182-byte data as shown in FIG. 2(*b*), when the signal S81 is a multiple of 13, i.e., when the data in the 13th row are transferred, addresses are generated as described above to store the row-direction parities in the appropriate storage position shown in FIG. 2(*c*).

Accordingly, the 12 rows of data shown in FIG. 2(*b*) are stored in the blocks 0~11 shown in FIG. 3, and the parities in the 13th row are stored in the storage block having the origin of column address 0 and row address 72, i.e., the block 192 shown in FIG. 3. Data in the 14th row are the data in the next sector, and the data in the 1st row are stored in the storage block having the origin of column address 384 and row address 0, i.e., the block 12 shown in FIG. 3. To be specific, the data in the 1st row of the next sector are stored after the 0~12 rows of the previous sector. Likewise, the following 11 rows of data of this (next) sector are stored in the blocks 13~23, and the parities thereof are stored in the block 193.

When 16 sectors of data have been stored, the 192 rows of data shown in FIG. 2(*c*) are stored in the blocks 0~191 shown in FIG. 3, and the 16 rows of parities shown in FIG. 2(*c*) are stored in the blocks 192—shown in FIG. 3. Accordingly, these data are in the deinterleaved state wherein the data part is separated from the parity part, and the deinterleaving process as described above is not required in the subsequent ECC.

As described above, according to the third embodiment of the invention, the base-208 counter 8 is added to the data storage unit of the first embodiment, and the counter preset value generation circuit 2 has the deinterleaving function, whereby a specific part of data is stored in a specific storage position in the DRAM 16. Therefore, in addition to the effect of the first embodiment, the data which have been interleaved in the row direction can be stored in such state where these data are deinterleaved, whereby deinterleaving is not required in the subsequent ECC, resulting in a reduction in burden on the ECC.

While in this third embodiment the base-208 counter 8 is added to the structure of the first embodiment to perform deinterleaving, in the case where the base-208 counter 8 is added to the structure of the second embodiment to perform deinterleaving as well as storage position correction according to the data sync byte, the counter preset value generation circuit 2 generates a preset value to be applied to the base-208 counter 8 when it generates the preset values to be applied to the respective counters as described for the second embodiment. For example, the counter preset value generation circuit 2 instructs the counters 3~7 to have 27, 2, 91, 0, 0, respectively, and the base-208 counter 8 to have 0.

Moreover, as described for the first embodiment, when employing an error correction array of n bytes×m rows, in order to extend this third embodiment, a base-m counter is employed as the base-208 counter 8 of this third embodiment.

Embodiment 4

A data transfer device according to a fourth embodiment of the present invention is a data storage unit in which an array for error correction in a decoding process is realized in the storage state of a DRAM, and this data storage unit generates addresses of input data by using a plurality of counters and performs data storage by using the page mode frequently.

Figure 9:
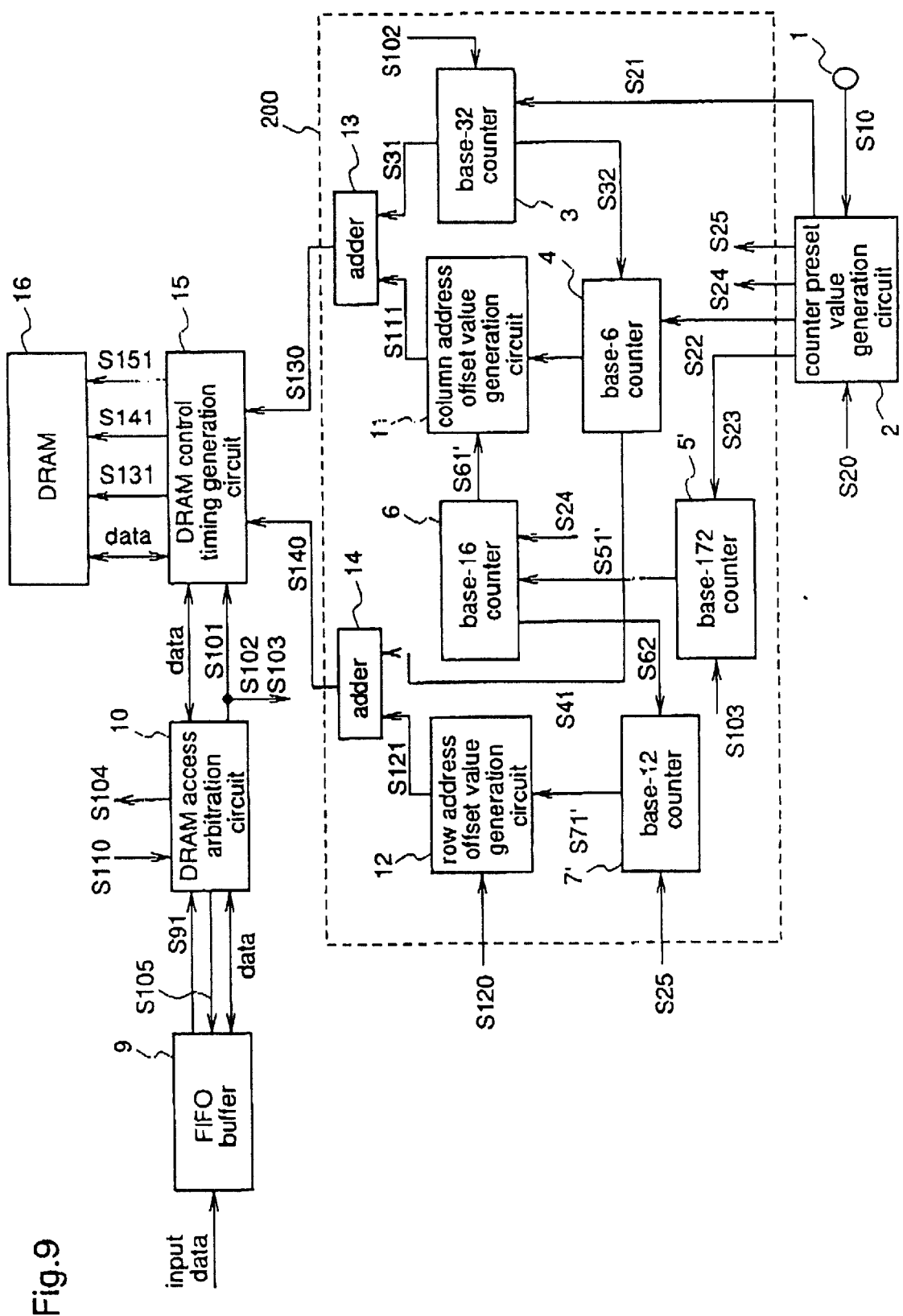
FIG. 9 is a block diagram illustrating a data storage unit according to a fourth embodiment of the present invention.

FIG. 9 is a block diagram illustrating a data storage unit according to the fourth embodiment of the present invention. As shown in the figure, the data storage unit comprises a counter preset value generation circuit 2, a storage address generation means 200, an FIFO buffer 9, a DRAM access arbitration circuit 10, a DRAM control timing generation circuit 15, and a DRAM 16. The storage address generation means 200 comprises a base-32 counter 3, a base-6 counter 4, a base-172 counter 5', a base-16 counter 6, a base-12 counter 7', a column address offset value generation circuit 11, a row address offset value generation circuit 12, a column address adder 13, and a row address adder 14. The data storage unit according to this fourth embodiment shares the DRAM 16 with a unit performing error correction or coding, and these units are controlled by a common CPU (Central Processing Unit). The storage unit has an ECC transfer start signal input terminal 1 to which an instruction from the CUP is applied.

The storage address generation means 200 generates storage addresses comprising row addresses and column addresses so that input data are successively stored in storage blocks having a predetermined size and arranged in the column direction of the DRAM 16, like the storage address generation means 100 according to the first embodiment (see FIG. 1). However, the storage format in the DRAM 16 of this fourth embodiment is different from that of the first embodiment and, therefore, the internal structure of the storage address generation means 200 is partly different from the means 100 of the first embodiment.

To be specific, in place of the base-182 counter 5 and the base-13 counter 7 possessed by the storage address generation means 100, the storage address generation means 200 has a base-172 counter 5' and a base-12 counter 7'.

The counter preset value generation circuit 2, the FIFO buffer 9, the DRAM access arbitration circuit 10, the DRAM control timing generation circuit 15, and the DRAM 16 are identical to those already described for the first embodiment.

The data storage unit so constructed forms a storage state in the DRAM 16, wherein data of 172 bytes in the column direction×192 bytes in the row direction, which is equivalent to an array obtained by excluding 10 bytes in the column direction and 16 bytes in the row direction from the array shown in FIG. 6(a), are arranged as shown in FIG. 6(b). The data so stored are read from the DRAM 16 to be encoded while being given row and column direction parities for error correction as shown in FIG. 2(c). Thereafter, the encoded data are read so as to be arranged as shown in FIG. 2(b), and the read data are given the data sync bytes and modulated to be recorded in the state as shown in FIG. 2(a).

Also in the data storage unit of this fourth embodiment, as in the third embodiment shown in FIG. 3, in any of the three planes ECC1–ECC3 in the DRAM 16, input data are block-by-block stored in the storage blocks having a predetermined size. However, although in the first embodiment 13 blocks are arranged in the row direction, in this fourth embodiment 12 blocks are arranged in the row direction. In other words, blocks BL0~BL191 are arranged in this fourth embodiment while blocks BL0~BL207 are arranged in the first embodiment. Further, although in the first embodiment 182 bytes of data are stored in one storage block in this fourth embodiment 172 bytes of data are stored in one storage block.

In order to implement the above-described storage, the base-172 counter 5' and the base-12 counter 7' operate as follows.

The base-172 counter 5' is a counter used for counting the data (n-172) in the column direction included in one row of the error correction array, i.e., the data included in one storage block. This counter 5' counts the bytes of the input data indicated by the transfer start signal, according to the base-172 notation, and when there is a carry, it outputs a carry signal to the base-16 counter 6.

The base-12 counter 7' is a counter used for counting the 12(m/i) blocks arranged in the row direction, and this counter 7' counts the carry from the base-16 counter 6 according to the base-12 notation. The result of the count by the base-12 counter 7 is used for generation of row address offset values as described later.

The base-32 counter 3, the base-6 counter 4, the base-16 counter 6, the column address offset value generation circuit 11, the row address offset value generation circuit 12, the column address adder 13, and the row address adder 14 are identical to those already described for the first embodiment.

Further, an ECC plane to be used is specified by a switching instruction signal S120 which is input to the row address offset value generation circuit 12 from the CPU disposed outside the data storage unit. When the count value obtained from the base-12 counter 7 is 0, the row address offset value generation circuit 12 generates a row address offset value indicating the origin of storage blocks in the specified ECC plane by selecting one of 0, 78, and 156 according to the signal S120.

The operation of the data storage unit of this fourth embodiment to store data into the DRAM 16 shown in FIG. 9 is identical to that of the first embodiment except the operations of the base-172 counter 5' and the base-12 counter 7'. Thereby, an array of 172 bytes in the column direction×192 bytes in the row direction is realized in the DRAM 16, which array is equivalent to an array obtained by excluding the parities for error correction from the format shown in FIG. 6(a). Also in this case, since the data are stored block by block as shown in FIG. 6(b), it is possible to use the paging mode more frequently compared with the storage state realized by the prior art.

As described above, the data storage unit of the fourth embodiment is equipped with the counter preset value generation circuit 2, the storage address generation means 200, and the DRAM control timing generation circuit 15, and data are stored in the DRAM 16 according to a format which enables frequent use of page mode when the data are readout in both the row direction and the column direction, whereby the processing efficiency is improved in the subsequent ECC for the stored data. That is, according to the data storage unit of this fourth embodiment, although the burden on the storage process itself is increased as compared with that of the prior art storage unit which simply stores data, in the subsequent error correction or decoding which is executed with the same device resources as used for the storage unit, the device resources are efficiently used, resulting in high-speed processing.

While in this fourth embodiment emphasis has been placed on storage of data to be subjected to ECC into the DRAM, it is also possible to implement an array similar to the error correction array by performing address generation for the result of the error correction in like manner as described above. Also in this case, the page mode can be frequently used in the subsequent processing to improve the efficiency.

Furthermore, in this fourth embodiment, in order to specify a storage block in the DRAM 16, the column address offset value generation circuit 11 and the row address offset value generation circuit 12 are employed, and the offset values generated by multiplication by these circuits are used as values indicating an origin of the storage region. However, in place of the offset value generation circuits 11 and 12 performing multiplication, a plurality of column address offset ROMs and a plurality of row address offset ROMs, each having an offset value, may be employed as offset value generation means.

Moreover, the format of the error correction array according to this fourth embodiment is merely an example, and a storage state of an array different from the array of this fourth embodiment can be obtained on the assumption that the storage address generation means 200 includes counters executing appropriate counting processes.

Embodiment 5

A data transfer device according to a fifth embodiment of the present invention functions as a decoder which realizes an array for error correction in a decoding process, and stores data and performs the decoding process by using a page mode frequently.

Figure 10:
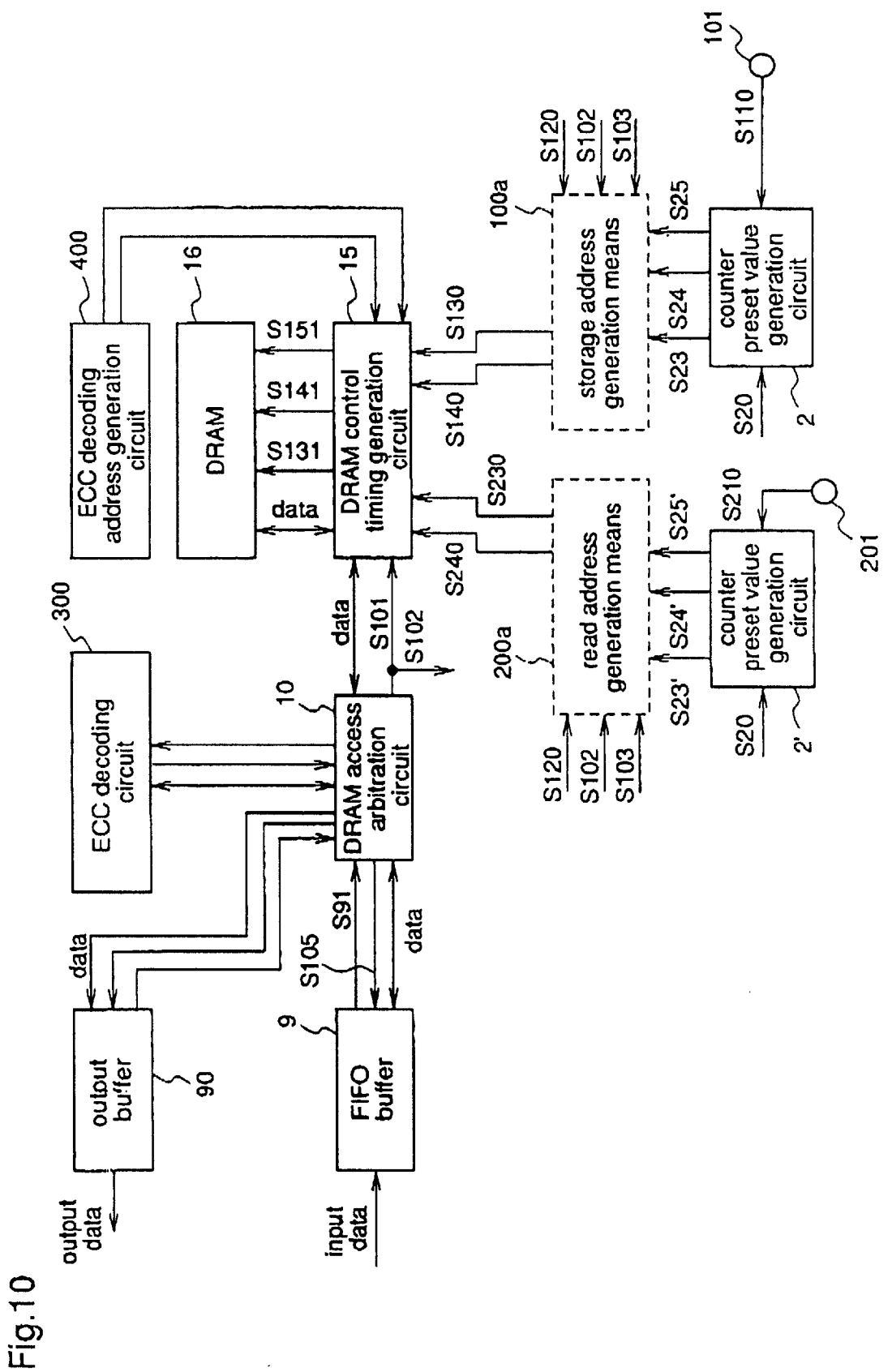
FIG. 10 is a block diagram illustrating a decoder according to a fifth embodiment of the present invention.

FIG. 10 is a block diagram showing a decoder for ECC decoding which is capable of performing error correction according to the fifth embodiment. Turning now to FIG. 10, the decoder of the fifth embodiment comprises counter preset value generation circuits 2 and 2', storage address generation means 100a, read address generation means 200a, an FIFO buffer 9, an output buffer 90, a DRAM access arbitration circuit 10, a DRAM control timing generation circuit 15, a DRAM 16, an ECC decoding circuit 300, and an ECC decoding address generation circuit 400. The decoder of the fifth embodiment is under control of a CPU (not shown). The decoder is provided with a data storage start signal input terminal 101 and a data reading start signal input terminal 201 to which an instruction of the CPU is input.

The storage address generation means 100a has an internal structure identical to that of the storage address generation means 100 of the data storage unit of the first embodiment, and the read address generation means 200a has an internal structure identical to that of the storage address generation means 200 of the data storage unit of the fourth embodiment. The roles of the counter preset value generation circuits 2 and 2' are to generate count values to be held in counters of the storage address generation means 100a and the read address generation means 200a, respectively, and output them to the corresponding counters.

The FIFO buffer 9 is a buffer for temporarily storing data on an FIFO basis, which holds data under control of the DRAM access arbitration circuit 10 until the data is transferred to the DRAM 16. The output buffer 90 is a buffer for temporarily storing decoded data as an output of the decoder of the fifth embodiment and is on an FIFO basis as in the case of the FIFO buffer 9.

The DRAM access arbitration circuit 10 is used to control inputting/outputting data to/from the DRAM 16. The circuit 10 is also used to control ECC decoding of data stored in the DRAM 16 and outputting the resulting decoded data. The DRAM control timing generation circuit 15 is used to generate a timing at which the DRAM 16 is accessed, and control inputting/outputting data to/from the DRAM 16 by the use of transfer addresses generated by the storage address generation means 100a, the read address generation means 200a, or the ECC decoding address generation circuit 400 and by specifying an address type according to an RAS signal or a CAS signal.

The ECC decoding address generation circuit 400 is used to generate an ECC decoding address for specifying a storage position of data to be read in the decoding process including ECC, and output the ECC decoding address to the DRAM control timing generation circuit 15. The ECC decoding circuit 300 is used to perform ECC decoding process to data specified by the addresses generated by the ECC decoding address generation circuit 400.

A description will now be given of operation of data processing performed by so constructed data decoder of the fifth embodiment.

The decoder of the fifth embodiment, as in the case of the first embodiment, receives data shown in FIG. 4(a) as an input. The data synchronous byte detection means (not shown in FIG. 10) deletes data synchronous bytes. The resulting data shown in FIG. 4(b) is input to the FIFO buffer 9 and is temporarily stored therein. As in the case of the first embodiment, the data synchronous byte detection means also supplies a data synchronous byte detection signal S20 to the counter preset value generation circuits 2 and 2', each of which counts the detection signal S20 and thereby counts the number of the data synchronous bytes.

The decoder of the fifth embodiment is supplied with a storage start signal S110 indicating that storage should be started which is output from the CPU via the input terminal 101. The storage start signal S110 is supplied to the counter preset value generation circuit 2, which generates counter preset signals S23–S25 for resetting and initializing respective counters of the storage address generation means 100a, and outputs the signals S23–S25 to respective counters. Thereby, the count values held in the counters are respectively set to "0". Thereafter, the addresses are generated by the storage address generation means 100a and data is stored according to the generated transfer addresses (storage addresses) as in the first embodiment. As a result, the DRAM 16 contains data in the storage state shown in FIG. 6(b).

In this fifth embodiment, when data of the ECC 1 plane (see FIG. 3) has been stored, the ECC decoding process starts. The ECC decoding address generation circuit 400 generates addresses so that the data is read in the direction shown in FIG. 6(b). Data is read in the row and column directions using the page mode frequently as already described in the first embodiment. The ECC decoding circuit 300 performs ECC decoding process in the row and column directions and the resulting data which has been error-corrected is stored in the DRAM 16.

When the data of the ECC 1 plane has been ECC decoded, the corrected data is read from the DRAM 16 and output to the output buffer 90. Although the data which has been subjected to the ECC decoding process is also stored in the DRAM 16 as shown in FIG. 6(b), data of (172 bytes in the column direction×192 bytes in the row direction) except error correction parity data (10 bytes in the column direction×16 bytes in the row direction) in the array shown in FIG. 6(a) becomes the output of the decoder of the fifth embodiment.

When a reading start signal S210 indicating that reading should be started is input from the CPU via the input terminal 210, the read address generation means 200a generates read addresses. The transfer addresses (read addresses) for specifying data of (172 bytes in the column direction×192 bytes in the row direction) in the array shown in FIG. 6(a) are generated. The addresses are generated so that 192 blocks (BL0 to BL191) shown in FIG. 6(b) are sequentially read and data (Da0 to Da171) of 172 bytes and the corresponding data in respective blocks is sequentially read. According to so generated read addresses, the data is read from the DRAM 16 under control of the DRAM control timing generation circuit 15, which is output through the DRAM access arbitration circuit 10 to the output buffer 90, to be stored therein. Then, the data is output as the output of the apparatus of the fifth embodiment.

As described above, in the decoder of the fifth embodiment, the data storage, the ECC decoding process, and the data reading are carried out by using the ECC plane as a unit (for each ECC plane). Therefore, at a data storage stage, an ECC processing stage, and a data reading stage, different ECC planes are subjected to time division process in parallel. For instance, at a first stage, data of the ECC 1 plane in FIG. 3 is stored, at a second stage, ECC processing for the ECC 1 plane and data storage for the ECC 2 plane are carried out in parallel, and at a third stage, data reading for the ECC 1 plane, ECC processing for the ECC 2 plane, and data storage for the ECC 3 plane are carried out in parallel, which sequence is repeated under control of the CPU. Thereby, even when transfer requests are issued continuously to the decoder, apparently, input data can be processed in real time without delay.

Thus, in accordance with the fifth embodiment, the decoder comprises the counter preset value generation circuits 2 and 2', the storage address generation means 100a, the read address generation circuit 200a, the FIFO buffer 9, the output buffer 90, the DRAM access arbitration circuit 10, the DRAM control timing generation circuit 15, the DRAM 16, the ECC decoding circuit 300, and the ECC decoding address generation circuit 400, and according the addresses generated by the storage address generation means 100a, data is stored in the DRAM 16. Therefore, it is possible to read data using the page mode frequently and perform speedy processing in the decoding process including error correction.

While the storage address generation means 100a and the read address generation means 200a have internal structures identical to those of the storage address generation means (see FIG. 1) and the storage address generation means 200 (see FIG. 9), respectively, the offset value generation circuit may be replaced by the offset ROM as already described in the first and fourth embodiments.

By changing counters included in the storage address generation means 100a and the read address generation means 200a, it becomes possible to handle formats other than the error correction format used in this embodiment.

In the decoder of the fifth embodiment, the storage address generation means 100a and the read address generation means 200a are provided separately, and the data storage, the ECC decoding process and the data reading are carried out in parallel for each ECC plane, as mentioned previously. This satisfies the need for real time processing. Conversely, if the real time processing is not demanded depending upon the use of the device, that is, if the data storage, the ECC decoding process, and the data reading are carried out in anti-parallel as a series of processing instead of in parallel, the storage address generation means 100a and the read address generation means 200a may share counters and the like, which results in a small-scale circuit.

Embodiment 6

A data transfer device according to a sixth embodiment of the present invention functions as an encoder which realizes an array for error correction in a coding process in storage state in a DRAM, and stores data and performs the coding process by using a page mode frequently.

Figure 11:
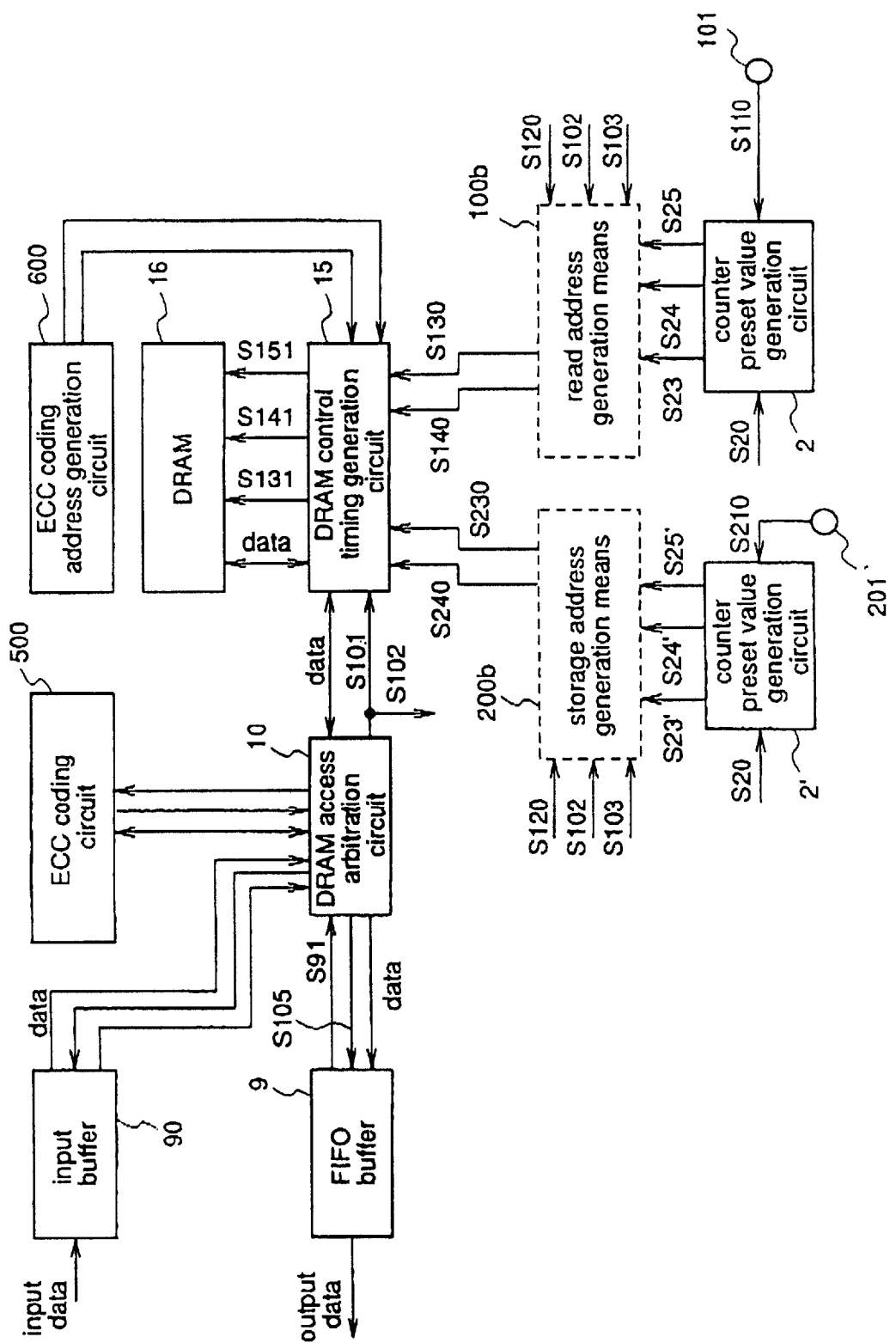
FIG. 11 is a block diagram illustrating an encoder according to a sixth embodiment of the present invention.

FIG. 11 is a block diagram showing an encoder for ECC coding which is capable of performing error correction according to the sixth embodiment. Turning now to FIG. 10, the encoder of the sixth embodiment comprises counter preset value generation circuits 2 and 2', read address generation means 100b, storage address generation means 200b, an FIFO buffer 9, an input buffer 90, a DRAM access arbitration circuit 10, a DRAM control timing generation circuit 15, a DRAM 16, an ECC coding circuit 500, and an ECC coding address generation circuit 600. The encoder of the sixth embodiment is under control of a CPU (not shown). The encoder is provided with a data storage start signal input terminal 201 and a data reading start signal input terminal 101 to which an instruction of the CPU is input.

The read address generation means 100b has an internal structure identical to that of the storage address generation means 100 of the data storage unit of the first embodiment, and the storage address generation means 200b has an internal structure identical to that of the storage address generation means 200 of the data storage unit of the fourth embodiment. The roles of the counter preset value generation circuits 2 and 2' are to generate count values to be held in counters of the read address generation means 100b and the storage address generation means 200b, respectively, and output them to the corresponding counters.

The input buffer 90 is a buffer for temporarily storing data to-be-coded as an input of the encoder on an FIFO basis. The FIFO buffer 9, the DRAM access arbitration circuit 10, and the DRAM control timing generation circuit 15 are identical to those of the decoder of the fifth embodiment.

The ECC coding address generation circuit 600 is used to generate an ECC coding address for specifying a storage position of data to be read in the coding process including ECC, and output the ECC coding address to the DRAM control timing generation circuit 15. The ECC coding circuit 500 is used to perform ECC coding process to data specified by the addresses generated by the ECC coding address generation circuit 600 to generate coded data to which error correction data has been added.

A description will be given of operation of data processing performed by so constructed encoder of the sixth embodiment.

When data-to-be-coded is input to the encoder, the input data is temporarily stored in the input buffer 90. Via the data storage start signal input terminal 201, a storage start signal S210 indicating that storage should be performed is supplied by the CPU. The signal S210 is supplied to the counter preset value generation circuit 2', which generates counter preset signals S23'–S25' for resetting and initializing respective counters of the storage address generation means 200b, and outputs these signals to respective counters. Thereby, the count values held in the counters are respectively set to "0". Thereafter, the addresses are generated by the storage address generation means 100*b* and data is stored according to the generated transfer addresses (storage addresses) as in the fourth embodiment. As a result, the DRAM 16 contains data arranged in an array (172 bytes in the column direction× 192 bytes in the row direction) except error correction data (10 bytes in the column direction×16 bytes in the row direction) as shown in FIG. 6(*a*). As shown in FIG. 6(*b*), BL0 to BL191 are stored, and in respective blocks, Da0 to Da171 and the corresponding data are stored.

In this sixth embodiment, when data of the ECC 1 plane (see FIG. 3) has been stored, the ECC coding process starts. The ECC coding address generation circuit 600 generates addresses for coding in the column direction according to the direction shown in FIG. 6(*b*). In this case, the addresses are generated so that data Da0 to Da171 and the corresponding data in respective blocks are read. The data is read using the page mode frequently as described in the fourth embodiment. In the coding process in the column direction performed by the ECC coding circuit 500, parity data in the column direction is stored in Da172 to Da181 and the corresponding positions (see FIG. 5) in respective blocks BL0 to BL191.

Subsequently, coding is performed in the row direction. In this case, as shown in FIG. 6(*a*), data of 192 bytes (D0, D182, . . . ) is read. The ECC coding address generation circuit 600 generates the addresses so that data expressed as black circles shown in FIG. 6(*b*) is sequentially read, and also in this case, the data is read using the page mode frequently. When the data has been read, the ECC coding circuit 500 performs coding process thereto to generate parity data in the row direction. According to the addresses generated by the ECC coding address generation circuit 600, parity data in the row direction corresponding to data expressed as black circles is stored in Da0 and the corresponding positions in respective blocks BL 192 to BL 208 shown in FIG. 6(*b*). Then, parity data in the following row direction is stored in Da1 and the corresponding positions in respective blocks. Thereafter, the same processing is repeated until parity data is stored in Da181 and the corresponding positions in respective blocks. The generated parity data can be stored using the page mode frequently. As a result of the above processing, data having the array shown in FIG. 6(*a*) is stored in a format shown in FIG. 6(*b*).

When the data of the ECC 1 plane has been ECC coded, the processed data is read from the DRAM 16 and output to the FIFO (output) buffer 9. When a read start signal S110 indicating that reading should be started is supplied by the CPU via the input terminal 101, the read address generation means 100*b* generates read address as in the first embodiment. The data which has been subjected to the ECC coding process is stored in the DRAM as shown in FIG. 6(*a*). That is, the data of (182 bytes in the column direction×208 bytes in the row direction) including error correction data (10 bytes in the column direction×18 bytes in the row address) is stored in the DRAM.

Figure 6:
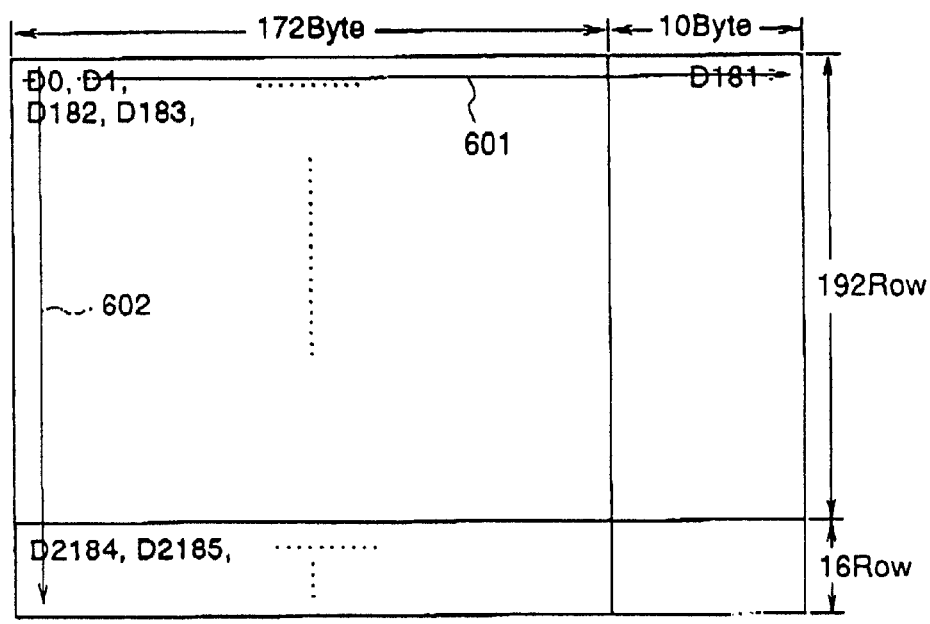
FIGS. 6(a) and 6(b) are diagrams for explaining reading of the stored data from the DRAM when performing syndrome operation in the ECC process.
Figure 6:
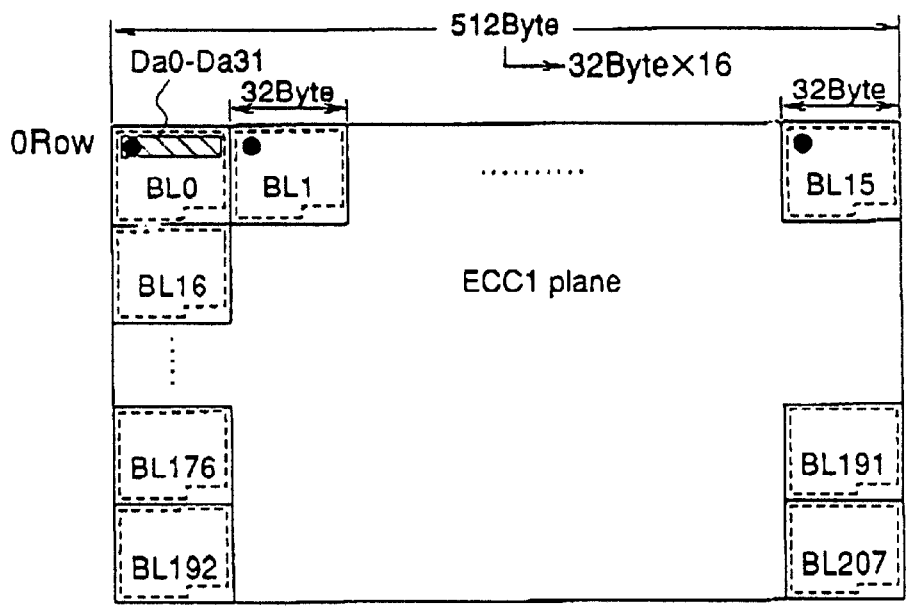
Figure 7:
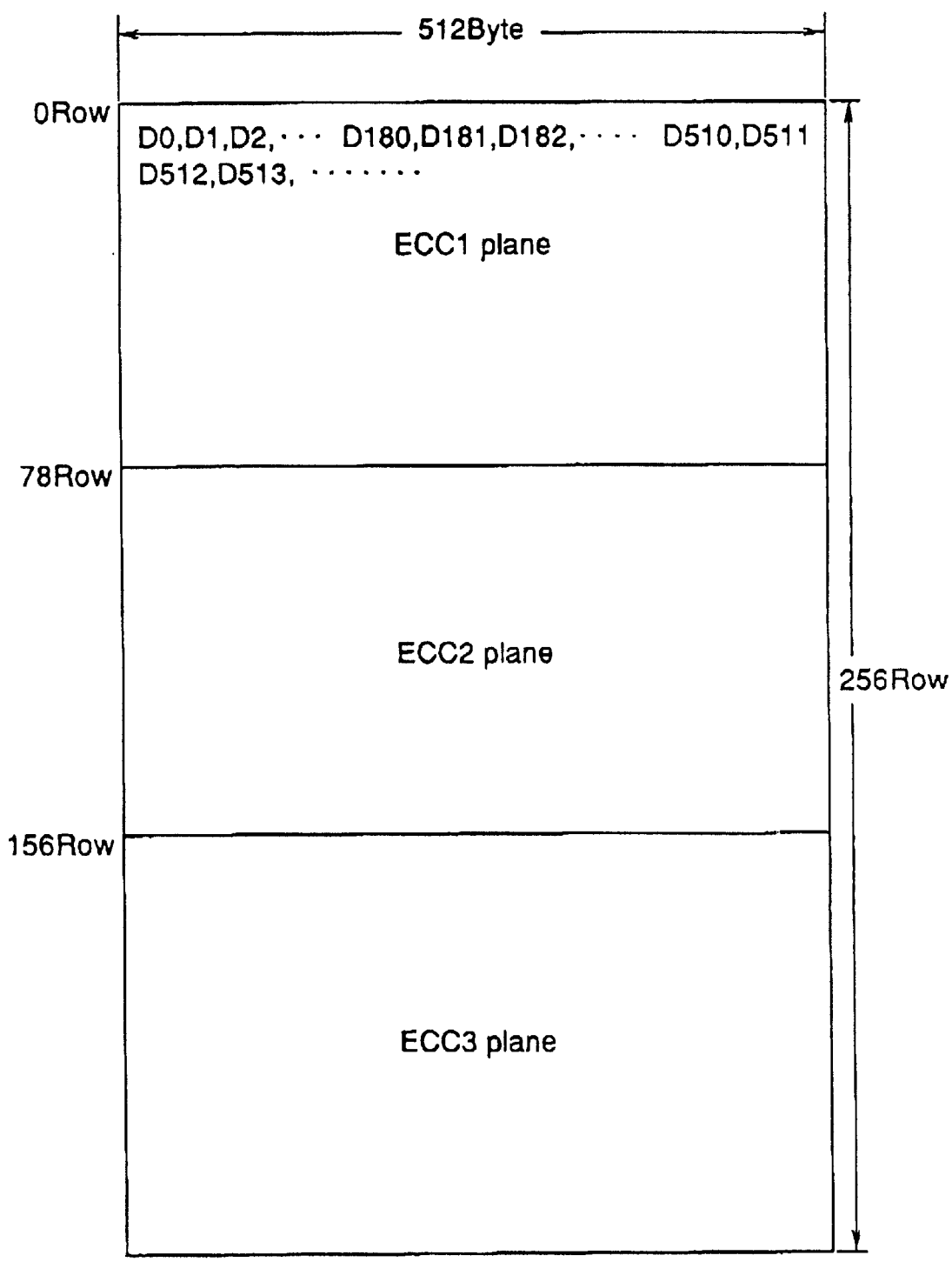
FIG. 7 is a memory map showing the storage state of data, obtained in the storage process according to the prior art.

The transfer addresses (read addresses) for specifying data of (182 bytes in the column direction×208 bytes in the row direction) shown in FIG. 6(*a*) are generated, and the data is read from the DRAM 16 under control of the DRAM control timing generation circuit 15, which is output through the DRAM access arbitration circuit 10 to the FIFO (output) buffer 9, to be stored therein. Then, the data is output as the output of the apparatus of the sixth embodiment.

As described above, in the encoder of the sixth embodiment, the data storage, the ECC coding process, and the data reading are carried out for each ECC plane. Therefore, at a data storage stage, an ECC processing stage, and a data reading stage, different ECC planes are subjected to time division process in parallel. For instance, at a first stage, data of the ECC 1 plane is stored, at a second stage, ECC processing for the ECC 1 plane and data storage for the ECC 2 plane are carried out in parallel, and at a third stage, data reading for the ECC 1 plane, ECC processing for the ECC 2 plane, and data storage for the ECC 3 plane are carried out in parallel, which sequence is repeated under control of the CPU. Thereby, even when transfer requests are issued continuously to the encoder, apparently, input data can be processed in real time without delay.

Thus, in accordance with the sixth embodiment, the encoder comprises the counter preset value generation circuits 2 and 2', the storage address generation means 200*b*, the read address generation means 100*b*, the FIFO buffer 9, the input buffer 90, the DRAM access arbitration circuit 10, the DRAM control timing generation circuit 15, the DRAM 16, the ECC coding circuit 500, and the ECC coding address generation circuit 600, and according the addresses generated by the storage address generation means 200*b*, data is stored in the DRAM 16. Therefore, it is possible to read data using the page mode frequently and perform speedy processing in the coding process including error correction.

While the read address generation means 100*b* and the storage address generation means 200*b* have internal structures identical to those of the storage address generation means 100 (see FIG. 1) and 200 (see FIG. 9), the offset value generation circuit may be replaced by the offset ROM as already described in the first and fourth embodiments.

By changing counters included in the read address generation means 100*b* and the storage address generation means 200*b*, it becomes possible to handle formats other than the error correction format used in this embodiment.

In the encoder of the fifth embodiment, the read address generation means 100*b* and the storage address storage generation means 200*b* are provided separately, and the data storage, the ECC coding process and the data reading are carried out in parallel for each ECC plane. This satisfies the need for real time processing. Conversely, if the real time processing is not demanded depending upon the use of the device, that is, if the data storage, the ECC coding process, and the data reading are carried out in anti-parallel as a series of processing instead of in parallel, the reading address generation means 100*b* and the storage address generation means 200*b* may share counters and the like, which results in a small-scale circuit.

Further, the decoder of the fifth embodiment and the encoder of the sixth embodiment may share the DRAM, the address generation means and the like, and serve as the ECC decoder and the ECC encoder, respectively. Also in this case, as in the case of the fifth and sixth embodiments, speedy processing can be realized by using the DRAM efficiently.

Embodiment 7

A data transfer device according to a seventh embodiment of the present invention functions as an encoder which uses a page mode frequently in a DRAM, and stores interleaved data and performs a coding process thereto.

Figure 12:
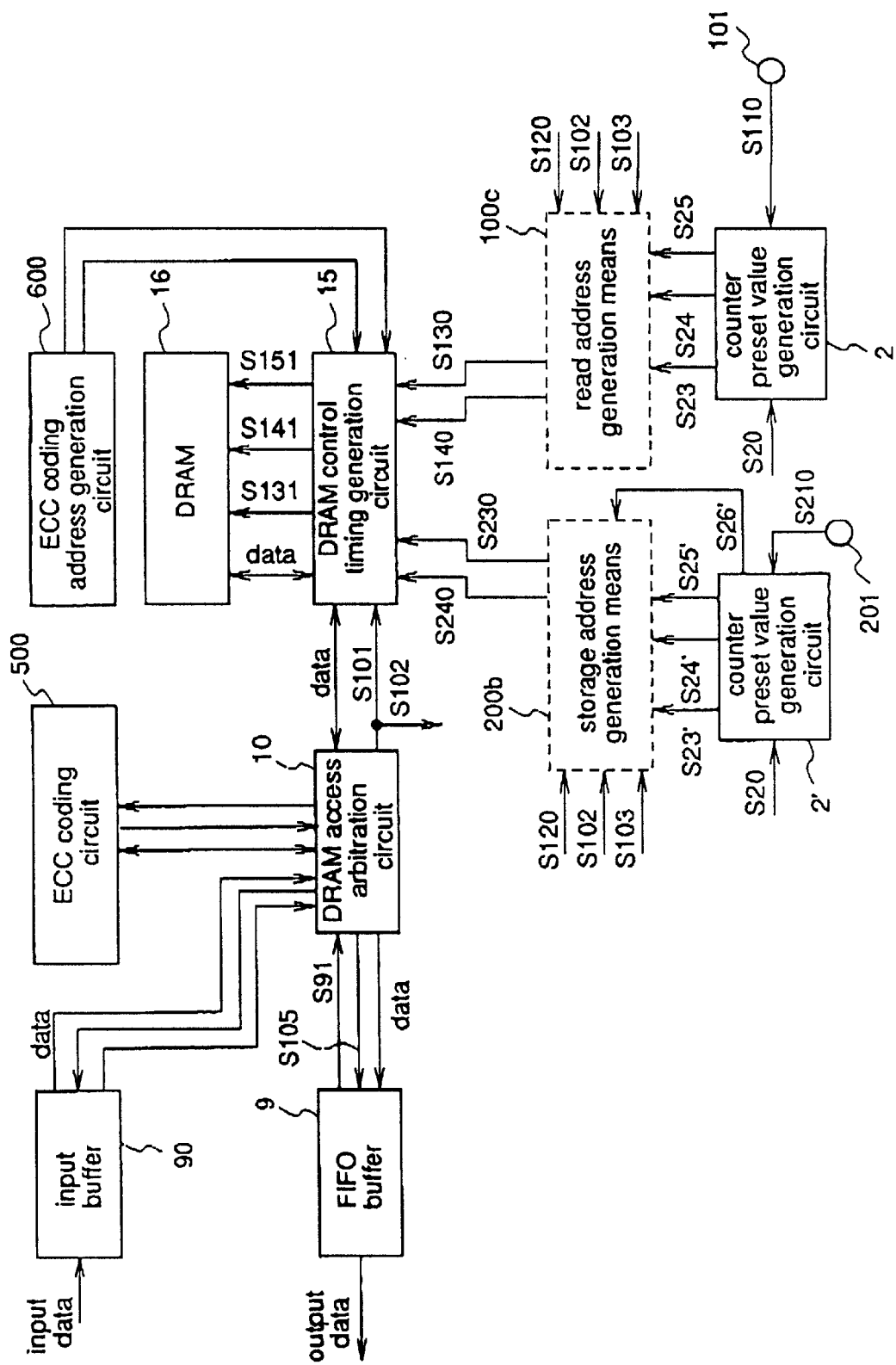
FIG. 12 is a block diagram illustrating an encoder according to a seventh embodiment of the present invention.

FIG. 12 is a block diagram showing an encoder for ECC coding which is capable of performing error correction according to a seventh embodiment of the present invention. Turning now to FIG. 12, the encoder of the seventh embodiment has construction identical to that of the sixth embodiment (FIG. 11) except read address generation means 100*c*. While the read address generation means 100*b* (FIG. 11) of the encoder of the sixth embodiment has an internal structure identical to that of the storage address generation means 100 of the data storage unit (FIG. 1) of the first embodiment, the read address generation means 100c of the seventh embodiment has an internal structure identical to that of the storage address generation means 100' of the data storage unit (FIG. 8) of the third embodiment, and therefore includes a base-208 counter as shown in FIG. 8.

In the encoder of the seventh embodiment, data is stored in the DRAM 16 and the stored data is subjected to ECC processing as in the case of the sixth embodiment, while data which has been subjected to ECC processing and is stored in the DRAM 16 is read and output in a different way.

To be specific, the read address generation means 100c of the seventh embodiment generates transfer addresses (read addresses) as in the case of address generation process of the third embodiment, and according to the generated addresses, the data stored in the DRAM 16 is read, and output as in the sixth embodiment. The coded data, i.e., the output of the encoder has been interleaved, and an interleaving process becomes unnecessary in processes at subsequent stages (modulation for recording output data, addition of a synchronous signal and the like), whereby efficiency in processing in the whole system is increased and a small-scale circuit is realized.

The interleaved coded data is decoded by the use of the storage address generation means 100' of the data storage unit (see FIG. 8) as already described in the third embodiment. To be more detailed, if the storage address generation means 100a of the decoder of the fourth embodiment in FIG. 10 has an internal structure identical to that of the storage address generation means 100', then deinterleaved data is stored in the DRAM 16, and thereby it is possible to relieve processing burden on the ECC coding process at the subsequent stage.

Thus, in accordance with the encoder of the seventh embodiment with the construction similar to that of the sixth embodiment, the base-208 counter 8 has been added to the read address generation means 100c of the sixth embodiment, the counter preset value generation circuit 2 has a deinterleaving capability, and data in specified storage positions of the DRAM 16 is read therefrom. Therefore, in addition to the data storage state which can increase efficiency in the subsequent ECC processing as described in the sixth embodiment, in this seventh embodiment, data interleaved in the row direction can be read, and processing burden on the whole system can be relieved because the interleaving process may be dispensed with in the subsequent process.

Embodiment 8

A data transfer device according to an eighth embodiment of the present invention functions as a data reproduction apparatus for reproducing data recorded in a recording medium such as an optical disc.

Figure 13:
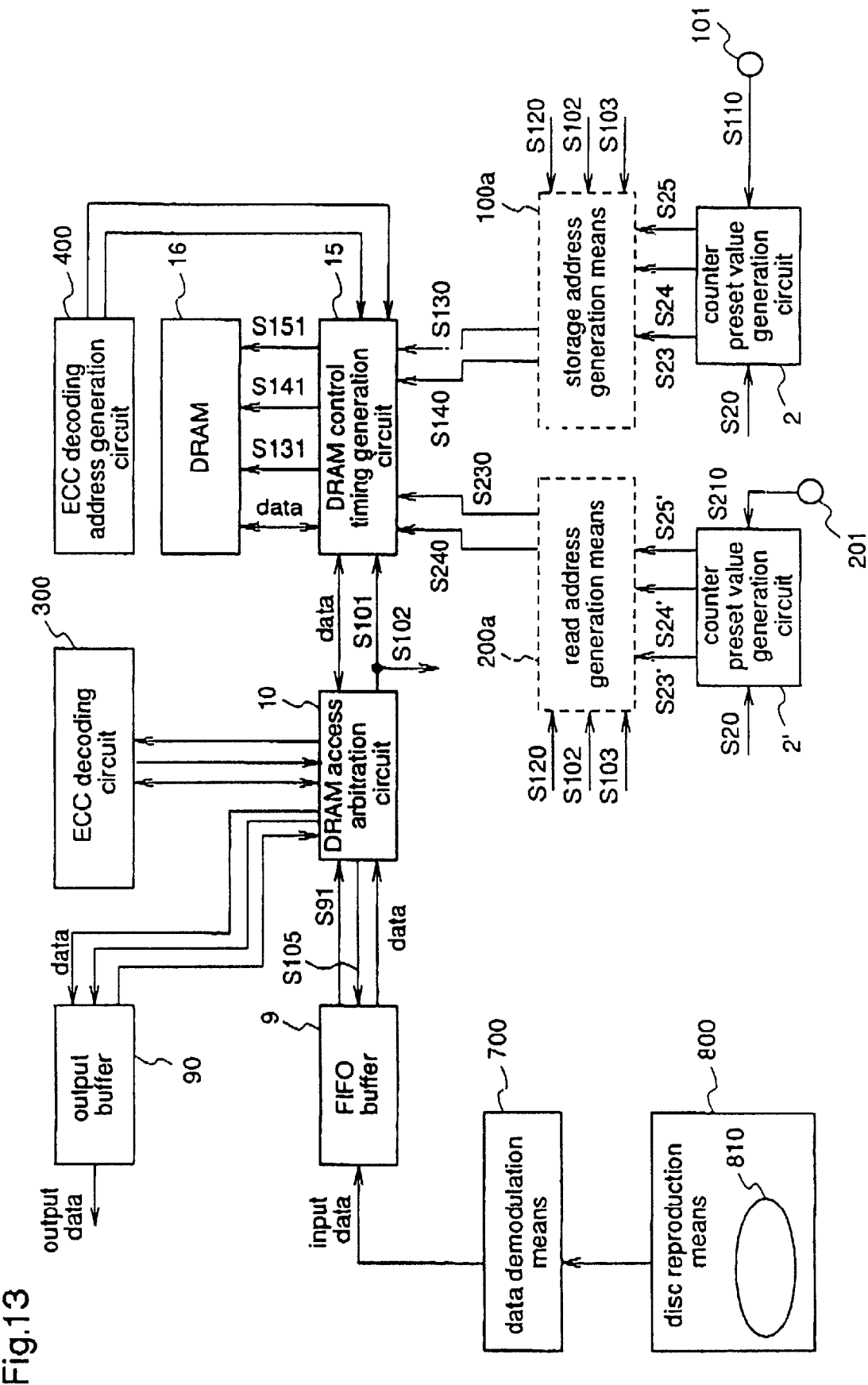
FIG. 13 is a block diagram illustrating a data reproduction apparatus according to an eighth embodiment of the present invention.

FIG. 13 is a block diagram showing the data reproduction apparatus of the eighth embodiment.

Turning now to FIG. 13, the data reproduction apparatus of the eighth embodiment includes data demodulation means 700 and disc reproduction means 800 in addition to the components of the decoder of the fifth embodiment.

The optical disc reproduction means reads data from a recording medium 810 and outputs the data to the data demodulation means 700. The data demodulation means 700 performs a demodulation process in a manner adapted to a modulation process which has been performed to the data recorded in the recording medium 810, and outputs the resulting data to an FIFO buffer 9 as an input buffer.

In the data reproduction apparatus of the eighth embodiment, the following operation is similar to that of the fifth embodiment. Hence, as in the fifth embodiment, the decoding process including the error correction is performed with high efficiency.

Thus, in accordance with the data reproduction apparatus of the eighth embodiment, the data demodulation means 700 and the disc reproduction means 800 have been added to the decoder of the fifth embodiment, and the data which has been read from the recording medium and demodulated is decoded as in the case of the fifth embodiment. Therefore, it is possible to read data by using the page mode frequently and perform speedy processing in the decoding process including error correction.

Embodiment 9

A data transfer device according to a ninth embodiment of the present invention functions as a data recording apparatus for recording data in a recording medium such as an optical disc.

Figure 14:
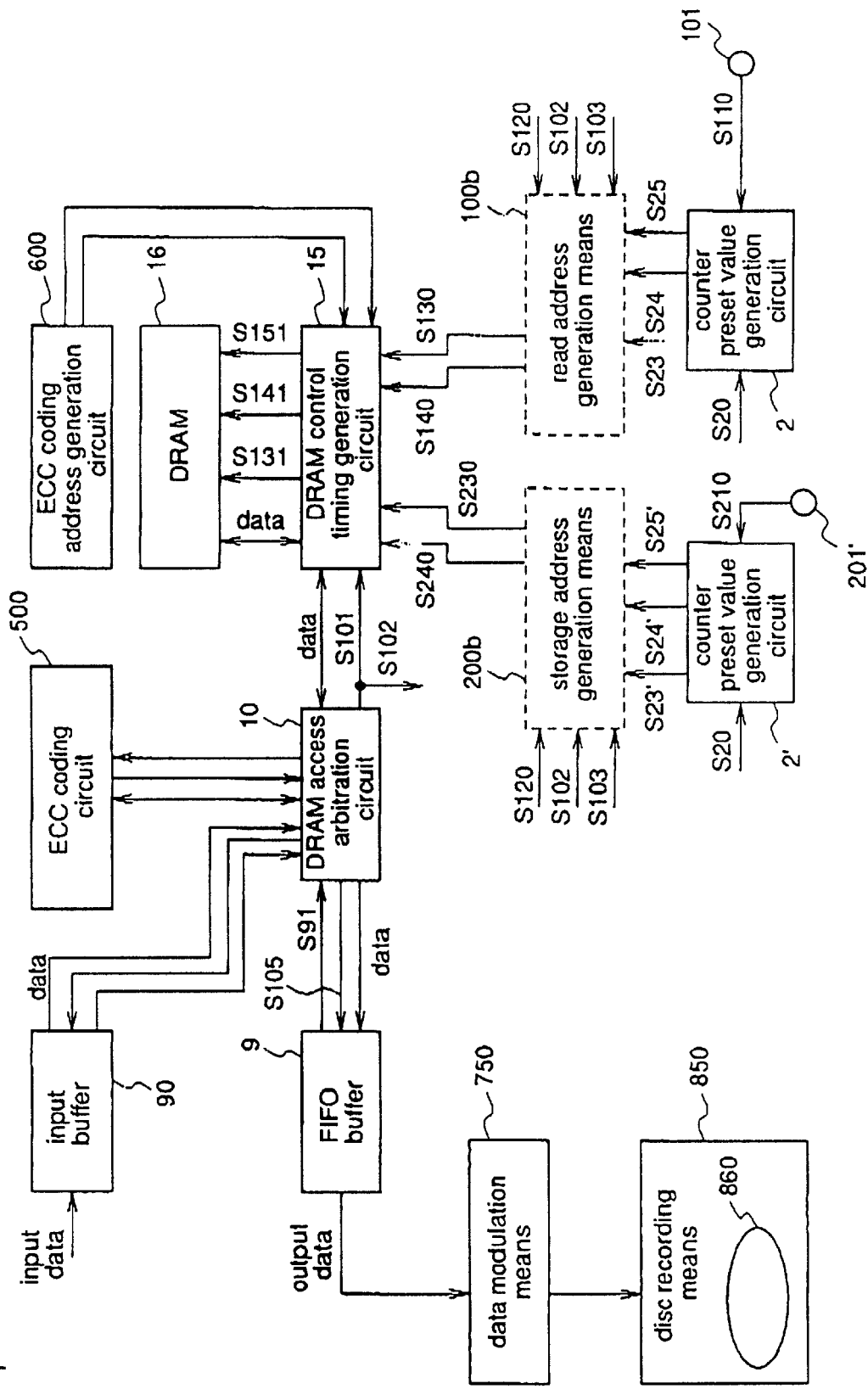
FIG. 14 is a block diagram illustrating a data recording apparatus according to a sixth embodiment of the present invention.

FIG. 14 is a block diagram showing the data recording apparatus of the ninth embodiment.

Turning now to FIG. 14, the data recording apparatus of the ninth embodiment includes data modulation means 750 and disc recording means 850 in addition to the components of the decoder of the sixth embodiment.

The data modulation means 750 modulates input data and outputs the resulting modulated data to the disc recording means 850. The disc recording means 850 records the modulated data records in a recording medium 860 such as the optical disc.

In the data recording apparatus of the ninth embodiment, data to-be-recorded is input and then subjected to the ECC coding process as in the sixth embodiment, followed by modulation by the data modulation means 750 and recording by the disc recording means 850. Therefore, in the coding process including error correction, high efficiency is achieved as in the sixth embodiment.

Thus, in accordance with the data recording apparatus of the ninth embodiment, the data modulation means 750 and the disc recording means 850 have been added to the encoder of the sixth embodiment, and the data which has been decoded as in the fifth embodiment is modulated and then recorded. Therefore, it is possible to read data by using the page mode frequently and perform speedy processing.

Further, the data reproduction apparatus of the eighth embodiment and the data recording apparatus of the ninth embodiment may share the DRAM, the address generation means, and the like, and may perform processing under control of the CPU. Also in this case, as in the eighth and ninth embodiments, speedy processing can be realized by using the DRAM efficiently.

What is claimed is:

1. A data transfer device for successively storing data in data storage means or successively reading data from the data storage means, in data processing using an array of m rows×n columns, said device comprising:

data storage means for retaining data which have been stored in storage positions specified by row addresses indicating the positions in the row direction and column addresses indicating the positions in the column direction;

transfer address generation means for generating transfer addresses comprising the row addresses and the column addresses so that the storage positions for transferred data are successively specified in each of storage blocks having a predetermined size and arranged in the column direction of the data storage means; and transfer control means for controlling data transfer to the data storage means by using the transfer addresses generated by the transfer address generation means.

2. The data transfer device of claim 1 wherein said transfer address generation means comprises:
   base-n count means for counting the successively-transferred data according to the base-n notation;
   base-i count means for counting carries generated in the counting process of the base-n count means, according to the base-i notation, with the number of the storage blocks in the column direction being i;
   column address offset value generation means for generating column address offset values indicating origins in the column direction of the respective storage blocks, according to the result from the base-i count means;
   base-k count means for counting the input data according to the base-k notation, with the size of each storage block in the column direction being k, thereby generating reference column address values indicating storage positions in the column direction within the respective storage blocks;
   base-n/k count means for counting carries generated in the counting process of the base-k count means according to the base-n/k notation, thereby generating reference row address values indicating storage positions in the row direction within the respective storage blocks;
   base-m/i count means for counting carries generated in the counting process of the base-i count means according to the base-m/i notation;
   row address offset value generation means for generating row address offset values indicating origins in the row direction of the respective storage blocks, according to the result of the count by the base-m/i count means;
   column address generation means for generating said column addresses by using the column address offset values and the reference column address values; and
   row address generation means for generating said row addresses by using the row address offset values and the reference row address values.

3. The data transfer device of claim 1 wherein said successively-transferred data include data synchronous signals which can be specified by a format, at intervals of a predetermined amount of the data; and
   said device further including count instruction means for obtaining the storage positions for data which follow the data synchronous signal by arithmetic operation, according to the data synchronous signal, and controlling the transfer address generation means to generate transfer addresses indicating the storage positions so obtained.

4. The data transfer device of claim 1 further including:
   base-n count means for counting the successively-transferred data according to the base-n notation;
   base-m count means for counting carries generated in the base-n count means according to the base-m notation; and
   count instruction means for obtaining storage positions of specific data by arithmetic operation and controlling the transfer address generation means to generate transfer addresses indicating the obtained storage positions, when transferring the result of predetermined rearrangement performed to the specific data among the transferred data according to the result from the base-m count means.

5. The data transfer device of claim 1 wherein the data processing using an array of m rows×n columns comprises data processing using an array of m1 rows×n1 columns and data processing using an array of m2 rows×n2 columns, on condition that m1>m2 and n1>n2.

6. The data transfer device of claim 1 further including:
   error correction data conversion means performing predetermined data conversion with error correction to the data stored in the data storage means; and
   conversion address generation means for specifying storage positions for data to be read from the data storage means for the data conversion.

7. The data transfer device of claim 6 further including:
   data format conversion means performing signal conversion between a data format processed by the data transfer device and a data format in a recording medium for data storage; and
   data transfer means for data storage, performing data transfer between the data transfer device and the recording medium.

8. A data transfer method for successively storing data in data storage means or successively reading data from the data storage means in data processing using an array of m rows×n columns, while specifying the storage positions by row addresses indicating the positions in the row direction and column addresses indicating the positions in the column direction, said method comprising:
   transfer address generation step of generating transfer addresses comprising the row addresses and the column addresses so that the storage positions for the transferred data are successively specified in each of storage blocks having a predetermined size and arranged in the column direction of the data storage means; and
   transfer control step of controlling data transfer to the data storage means by using the transfer addresses generated in the transfer address generation step.

9. The data transfer method of claim 8 wherein the transferred data have data synchronous signals which can be specified by a format, at intervals of a predetermined amount of the data; and
   said method further including count instruction step of obtaining the storage positions for data which follow the data synchronous signal, by arithmetic operation, according to the data synchronous signal, and controlling the transfer address generation means to generate transfer addresses indicating the storage positions so obtained.

10. The data transfer method of claim 8 further including:
    base-n count step of counting the successively-transferred data according to the base-n notation;
    base-m count step of counting carries generated in the base-n count step according to the base-m notation; and
    count instruction step of obtaining storage positions for specific data by arithmetic operation and controlling the process in the transfer address generation step to generate transfer addresses indicating the obtained storage positions, when transferring the result of predetermined rearrangement performed to the specific data among the transferred data according to the result from the base-m count step.

11. The data transfer method of claim 8 wherein the data processing using an array of m rows×n columns comprises data processing using an array of m1 rows×n1 columns and data processing using an array of m2 rows×n2 columns, on condition that m1>m2 and n1>n2.

12. The data transfer method of claim 11 wherein the array of m1 rows×n1 columns comprises a main data part corresponding to the array of m2 rows×n2 columns, and an error correction parity part which is generated by a predetermined method based on the main data part.

13. The data transfer method of claim 8 further including:

error correction data conversion step of performing predetermined data conversion with error correction to the data stored in the data storage means; and conversion address generation step of specifying storage positions for data to be read from the data storage means for the data conversion.

14. The data transfer method of claim 13 wherein:

said error correction data conversion step is error correction data coding step of performing a predetermined data coding process including error correction; and said conversion address generation step is coding address generation step of specifying storage positions for data to be read for the data coding process.

15. The data transfer method of claim 13 wherein:

said error correction data conversion step is error correction data decoding step of performing a predetermined data decoding process including error correction; and said conversion address generation step is decoding address generation step of specifying storage positions for data to be read for the data decoding process.

16. The data transfer method of claim 13 further including:

data format conversion step of performing signal conversion between a data format used in the data transfer method and a data format in a recording medium for data storage; and data transfer step for data storage, performing data transfer to the recording medium.

17. The data transfer method of claim 16 wherein:

said data format conversion step is data modulation step of performing modulation to coded data generated in the data coding process; and said data transfer step is data recording step of recording the data in the recording medium.

18. The data transfer method of claim 16 wherein:

said data format conversion step is data demodulation step of performing demodulation to generate coded data to be processed in a data decoding process; and said data transfer step is data reproduction step of reading demodulated data from the recording medium.

* * * * *